(12) United States Patent
Russell

(10) Patent No.: US 10,955,860 B2
(45) Date of Patent: Mar. 23, 2021

(54) UNMANNED AERIAL VEHICLES

(71) Applicant: Iain Matthew Russell, London (GB)

(72) Inventor: Iain Matthew Russell, London (GB)

( * ) Notice: Subject to any disclaimer, the term of this patent is extended or adjusted under 35 U.S.C. 154(b) by 160 days.

(21) Appl. No.: 15/899,410

(22) Filed: Feb. 20, 2018

(65) Prior Publication Data

US 2018/0244387 A1 Aug. 30, 2018

(30) Foreign Application Priority Data

Feb. 28, 2017 (GB) .................................. 1703174.1
Feb. 6, 2018 (GB) .................................. 1801936.4

(51) Int. Cl.
| | |
|---|---|
| G05D 1/10 | (2006.01) |
| B64C 39/02 | (2006.01) |
| B64D 45/08 | (2006.01) |
| B64D 47/08 | (2006.01) |
| G05D 1/06 | (2006.01) |
| G05D 1/00 | (2006.01) |
| G08G 5/04 | (2006.01) |

(52) U.S. Cl.
CPC ........... *G05D 1/102* (2013.01); *B64C 39/024* (2013.01); *B64D 45/08* (2013.01); *B64D 47/08* (2013.01); *G05D 1/0055* (2013.01); *G05D 1/0088* (2013.01); *G05D 1/0094* (2013.01); *G05D 1/0661* (2013.01); *G08G 5/04* (2013.01); *B64C 2201/024* (2013.01); *B64C 2201/127* (2013.01); *B64C 2201/141* (2013.01)

(58) Field of Classification Search
CPC .......... B64C 2201/18; B64C 2201/123; B64C 2201/126; B64C 2201/127; B64C 2201/182; B64C 2201/208; G05D 1/102

USPC ...................................................... 244/17.13
See application file for complete search history.

(56) References Cited

U.S. PATENT DOCUMENTS

| | | | |
|---|---|---|---|
| 6,079,862 A | 6/2000 | Kawashima | |
| 9,421,869 B1 * | 8/2016 | Ananthanarayanan | ...................... |
| | | | B60L 5/005 |
| 9,555,897 B2 * | 1/2017 | Eline | ..................... B64C 39/024 |

(Continued)

FOREIGN PATENT DOCUMENTS

| | | |
|---|---|---|
| CN | 104483987 A | 4/2015 |
| CN | 204236781 U | 4/2015 |

(Continued)

OTHER PUBLICATIONS

Dan Gettinger, Feb. 1, 2016, "The Drones of the Atomic Age", available from https://dronecenter.bard.edu/the-drones-of-the-atomic-age/.

(Continued)

*Primary Examiner* — Joshua E Rodden

(57) ABSTRACT

An unmanned aerial vehicle, UAV, is operable in an autonomous mode. The UAV comprises an upwards-configurable sensor an actuator and a controller. The upwards-configurable sensor is configurable in an upwards-facing configuration during an autonomous procedure such that a field of view of the upwards-configurable sensor includes airspace directly above the UAV during the autonomous procedure. The controller is operable to control the actuator during the autonomous procedure based on data captured by the upwards-configurable sensor to cause the UAV to make physical contact with an object in the airspace directly above the UAV during the autonomous procedure.

18 Claims, 5 Drawing Sheets

(56) References Cited

U.S. PATENT DOCUMENTS

| | | | | |
|---|---|---|---|---|
| 9,720,413 | B1* | 8/2017 | Lema | G05D 1/0088 |
| 9,753,461 | B1* | 9/2017 | Johnson | B64C 39/024 |
| 9,873,524 | B2* | 1/2018 | Fisher | B64F 1/12 |
| 9,878,787 | B2* | 1/2018 | Chan | B64C 39/024 |
| 10,407,182 | B1* | 9/2019 | Alcorn | B64C 39/024 |
| 10,418,853 | B2* | 9/2019 | Yang | B60L 53/34 |
| 2014/0240498 | A1* | 8/2014 | Ohtomo | B64D 47/08 |
| | | | | 348/144 |
| 2014/0251743 | A1* | 9/2014 | Childress | B60L 9/00 |
| | | | | 191/12 R |
| 2014/0371952 | A1 | 12/2014 | Ohtomo et al. | |
| 2015/0314434 | A1* | 11/2015 | Bevins, Jr. | B23D 59/001 |
| | | | | 30/514 |
| 2015/0379876 | A1* | 12/2015 | Navot | G08G 5/0021 |
| | | | | 701/301 |
| 2016/0023761 | A1* | 1/2016 | McNally | B64C 39/024 |
| | | | | 29/407.01 |
| 2016/0068264 | A1 | 3/2016 | Ganesh et al. | |
| 2016/0130010 | A1* | 5/2016 | Keennon | B64C 27/12 |
| | | | | 244/17.13 |
| 2016/0152345 | A1 | 6/2016 | Molnar | |
| 2016/0214713 | A1 | 7/2016 | Cragg | |
| 2016/0347192 | A1* | 12/2016 | Lee | B60L 53/30 |
| 2017/0010623 | A1 | 1/2017 | Tang | |
| 2017/0221394 | A1 | 8/2017 | Garcia | |
| 2017/0233099 | A1 | 8/2017 | Kuhara | |
| 2017/0240296 | A1 | 8/2017 | Molnar | |
| 2018/0092345 | A1 | 4/2018 | Okumura | |
| 2019/0016254 | A1 | 1/2019 | Salter | |
| 2019/0047696 | A1* | 2/2019 | Gwin | B25J 9/1085 |
| 2019/0094149 | A1* | 3/2019 | Troy | G01M 5/0008 |
| 2019/0149724 | A1* | 5/2019 | Wu | H04N 5/232 |
| 2019/0261490 | A1 | 8/2019 | Havey | |
| 2020/0324902 | A1 | 10/2020 | Burgess | |

FOREIGN PATENT DOCUMENTS

| | | |
|---|---|---|
| CN | 2049792441 U | 1/2016 |
| CN | 205633086 U | 10/2016 |
| CN | 106379121 A | 2/2017 |
| CN | 106379548 A | 2/2017 |
| CN | 206031806 U | 3/2017 |
| EP | 3193228 A2 | 7/2017 |
| GB | 2528489 A | 1/2016 |
| KR | 20170093579 A | 8/2017 |
| WO | 2017209974 A1 | 12/2017 |
| WO | 2018/045635 A1 | 3/2019 |

OTHER PUBLICATIONS

Bomber County Aviation Resource, 2008-2015, "English Electric Canberra", available from http://www.bacr.org.uk/english-electric-canberra.

Jinx, Jun. 13, 2008, "Incindent English Electric Canberra U.14 Drone WH921, Oct. 6, 1961", available from https://aviation-safety.net/wikibase/21051.

* cited by examiner

UNMANNED AERIAL VEHICLES

CROSS-REFERENCE TO RELATED APPLICATIONS

This application claims priority under 35 U.S.C. § 119(a) to UK Patent Application Nos. GB1703174.1, filed on Feb. 28, 2017 and GB1801936.4, filed on Feb. 6, 2018. The entire content of each of these patent applications is hereby incorporated by reference.

TECHNICAL FIELD

This disclosure relates to unmanned aerial vehicles (UAVs). In particular, this disclosure relates to UAVs, methods of controlling and configuring UAVs, controllers and computer programs.

BACKGROUND

A UAV, which may also be known as a 'drone' or an 'unmanned aircraft system (UAS)', is an aircraft that does not have a human pilot aboard.

A UAV may carry an item. Examples of such items include, but are not limited to, people, food, medicine, parcels, tools etc.

A UAV may be in the form of a rotorcraft (or 'rotary-wing aircraft'). An example of a rotorcraft is a multicopter (or 'multirotor'). A multicopter is a rotorcraft that has more than two rotors, a rotor being a vertically oriented propeller. The multicopter is lifted and propelled by its rotors. Examples of multicopters include, but are not limited to, tricopters, quadcopters, hexacopters and octocopters, which have three, four, six and eight rotors respectively. Quadcopters are also known as 'quadrotor helicopters' or 'quadrotors'.

A UAV may be in another form. For example, a UAV may be fixed-wing, hybrid etc. A hybrid UAV may comprise both wings and one or more rotors.

A UAV may be operable in one or more operating modes. Different operating modes may have different levels (or 'degrees' or 'measures') of autonomy. For example, a UAV may be temporarily or permanently operable in a non-autonomous mode as a remotely piloted aircraft, where the UAV is under the control of a remote human operator. A UAV may be temporarily or permanently operable in a fully autonomous mode, where the UAV is fully under the control of one or more on-board computing systems of the UAV. A UAV may be temporarily or permanently operable in one or more intermediate modes, with one or more intermediate levels of autonomy between these two extremes.

The UAV may be able to perform one or more predetermined autonomous procedures. Examples of such predetermined autonomous procedures include, but are not limited to, self-level, hover, return-to-home, orbit and follow-me.

SUMMARY

According to first embodiments, there is provided an unmanned aerial vehicle, UAV, the UAV being operable in an autonomous mode, the UAV comprising:

an upwards-configurable sensor, the upwards-configurable sensor being configurable in an upwards-facing configuration during an autonomous procedure such that a field of view of the upwards-configurable sensor includes airspace directly above the UAV during the autonomous procedure;

an actuator; and a controller operable to control the actuator during the autonomous procedure based on data captured by the upwards-configurable sensor to cause the UAV to make physical contact with an object in the airspace directly above the UAV during the autonomous procedure.

According to second embodiments, there is provided an unmanned aerial vehicle, UAV, the UAV being operable in an autonomous mode, the UAV comprising:

an upwards-configurable sensor, the upwards-configurable sensor being configurable in an upwards-facing configuration during an autonomous procedure such that a field of view of the upwards-configurable sensor includes airspace directly above the UAV during the autonomous procedure;

an actuator; and a controller operable to control the actuator during the autonomous procedure based on data captured by the upwards-configurable sensor and data received from an object in the airspace directly above the UAV during the autonomous procedure.

According to third embodiments, there is provided an unmanned aerial vehicle, UAV, the UAV being operable in an autonomous mode, the UAV comprising:

an upwards-configurable sensor, the upwards-configurable sensor being configurable in an upwards-facing configuration during an autonomous procedure such that a field of view of the upwards-configurable sensor includes airspace directly above the UAV during the autonomous procedure;

an upwards-configurable light, the upwards-configurable light being configurable in the upwards-facing configuration during the autonomous procedure such that the upwards-configurable light is operable to illuminate an object in the airspace directly above the UAV during the autonomous procedure;

an actuator; and a controller operable to control the actuator during the autonomous procedure based on data captured by the upwards-configurable sensor.

BRIEF DESCRIPTION OF FIGURES

Various features will now be described, by way of example only, with reference to the accompanying drawings in which.

DETAILED DESCRIPTION

Figure 1:
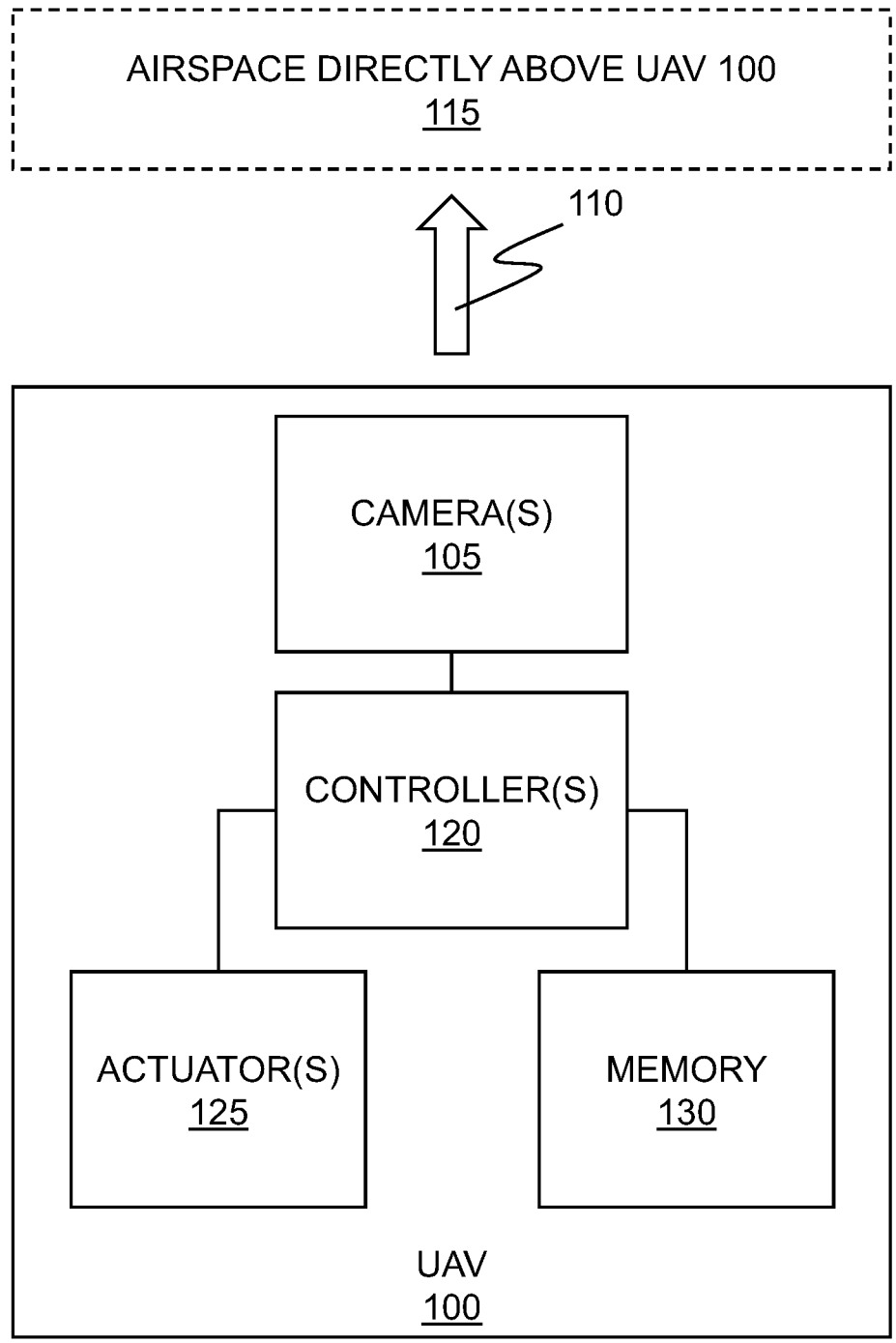
FIG. 1 shows a block diagram of an example UAV in accordance with embodiments.

Examples described herein relate generally to UAVs having enhanced autonomous capabilities.

In examples described herein, a UAV is operable in one or more autonomous modes.

The UAV comprises one or more sensors. Where the UAV comprises more than one sensor, the sensors may be of the same or different sensor types. Examples of sensor types include, but are not limited to, cameras, ultrasonic sensors and LIDAR sensors.

The one or more sensors are configurable in an upwards-facing configuration during an autonomous procedure such that a field of view of the one or more sensors includes airspace directly above the UAV during the autonomous procedure. Such one or more sensors may therefore be referred to as being 'upwards-configurable'. The term 'field of view' is used herein to mean the space observable by the sensor(s) and will be understood accordingly in the context of the type of sensor(s) concerned. For example, as well as a camera having a field of view, ultrasonic sensors and LIDAR sensors also have a field of view, namely the space(s) observable by such sensors.

The sensor(s) may be permanently or temporarily configured in the upwards-facing configuration. Where the UAV comprises more than one sensor, all of the sensors may be permanently configured in the upwards-facing configuration, all of the sensors may be temporarily configured in the upwards-facing configuration, or at least one of the sensors may be permanently configured in the upwards-facing configuration and at least one other of the sensors may be temporarily configured in the upwards-facing configuration.

The UAV also comprises a controller.

When the UAV operates in the autonomous mode, the controller receives data based on data captured by the sensor. For example, where the sensor comprises a camera, the controller receives data based on image data captured by the sensor.

The controller may control an actuator of the UAV during the autonomous procedure based on the received data and dependent on an object in the field of view of the sensor. As such, the controller can take into account the object in the field of view of the sensor in relation to the autonomous procedure. The dependency on the object in the field of view of the sensor may relate to the presence of the object, an attribute of the object, data received from the object etc.

As such, examples described herein provide a UAV that has at least one sensor that can be configured to be upwards-facing, for example one or more cameras that are configurable to be upwards-facing. The at least one upwards-facing sensor (in other words, the upwards-configurable sensor(s) when configured to be upwards-facing) allows the UAV to operate more effectively autonomously. The at least one upwards-facing sensor is effective where the autonomous procedure is an autonomous vertical take-off as the controller can, in effect, see above the UAV prior to and/or during autonomous take-off. However, the at least one upwards-facing sensor is also effective in other autonomous procedures to provide enhanced understanding of the environment above the UAV.

Such enhanced understanding may be useful, for example, where the UAV is deployed to perform one or more predetermined tasks in relation to an object in the airspace above the UAV. Examples of such predetermined tasks include, but are not limited to, inspecting the object, repairing the object, maintaining the object, accessing the object, renovating the object, cleaning the object, painting the object, changing the object, removing the object, replacing the object, opening the object, moving the object, providing power to the object, receiving power from the object, holding the object, attaching to the object, surveying the object etc. The UAV may be configured to perform the one or more predetermined tasks from below the object. For example, such a UAV may be effective in inspecting and/or repairing infrastructure that is difficult, expensive, time-consuming and/or dangerous for a human to access. A UAV as described herein may provide asset integrity.

In some specific examples described herein, a UAV has at least one upwards-facing camera that allows the UAV to operate more effectively during autonomous take-off. A camera is an example of a sensor. Other types of sensor are described herein. An autonomous take-off is a type of autonomous procedure. Other types of autonomous procedure are described herein. The at least one camera is configurable, permanently or temporarily (or a mix of permanently and temporarily where the at least one camera comprises multiple cameras), to have a field of view that includes airspace directly above the UAV during autonomous take-off. Where the at least one camera comprises multiple cameras, the field of view of the at least one camera may be considered to be the union of the fields of view of the respective cameras. The at least one camera may have a field of view that includes airspace directly above the UAV during one or more other autonomous procedures, as described in more detail herein.

As such, in these specific examples, the UAV can use image data captured by the camera(s) to enhance autonomous control during one or more autonomous procedures, for example autonomous take-off, by taking into account the presence or absence of any object(s) or obstacle(s) directly above the UAV. For example, the UAV may be able to avoid a collision with the obstacle(s). The UAV may alternatively or additionally be able to cause interaction with the object(s).

Use of at least one upwards-facing camera is especially effective during an autonomous take-off where the UAV takes off vertically, for example as may be the case with a rotorcraft. However, at least one upwards-facing camera may also be used during other predetermined autonomous procedures.

A camera type (or, more generally, sensor type) may be selected to enhance effectiveness of autonomous take-off, for example based on lighting levels, operating environments and/or proximity to nearby objects. The camera type may be selected at various different stages of deploying a UAV. For example, the camera type may be selected in designing and/or manufacturing the UAV. As such, a UAV can be provided that is optimised for a particular operation. Alternatively, or additionally, the camera type may be selected after the UAV is manufactured. For example, the camera type may be selected prior to and/or during the UAV undertaking an autonomous procedure. As such, a relatively flexible (or 'versatile') UAV, in terms of utility, may be provided that can be used in multiple different operations, with the most suitable camera(s) being selected based on a particular operation at hand. Further, a UAV may be provided in which one or more cameras, or more generally one or more sensors, are interchangeable.

Use of one or more cameras that capture visible light may facilitate operation where there are reasonable light levels, where disambiguation between different colours is beneficial and/or where objects are at a relatively large distance from the UAV, for example in some outdoor and/or open environments. Use of one or more infrared cameras may facilitate operation where there are relatively low light levels, where disambiguation between different temperatures is beneficial and/or where objects are at a relatively close distance from the UAV, for example in some indoor and/or confined environments. A stereo pair of cameras may be used to provide stereoscopic imaging to allow a volumetric model of the surrounding environment to be generated. A single camera may be used to provide monocular vision.

As such, a UAV as described herein may operate more safely, efficiently and/or effectively during an autonomous procedure, for example an autonomous take-off, than a UAV that does not use data from an upwards-facing sensor during an autonomous procedure.

Referring to FIG. 1, there is shown schematically an example UAV 100.

The UAV 100 is operable in an autonomous mode. In this example, the UAV 100 can take-off autonomously in the autonomous mode. The UAV 100 may be able to perform one or more autonomous procedures in addition to, or as an alternative to, autonomous take-off.

An autonomous procedure, in this specific example an autonomous take-off, may be in response to a trigger event. The trigger event may be a command from a remote human operator and/or another condition detected by the UAV 100. Examples of other conditions include, but are not limited to, completion of a predetermined operation (whether or not an autonomous operation), expiry of a timer, detection of a predetermined object in the vicinity of the UAV 100, receipt of a predetermined message etc. A non-limiting example of such a predetermined operation is successful delivery of an item, for example a parcel. A non-limiting example of such a timer is a wait-timer. The wait-timer may indicate an amount of time the UAV 100 should wait after delivering an item before autonomously taking off. The wait-timer may, for example, allow a recipient of the item to return the item to the UAV 100 if they are not satisfied with the item. It may be more efficient for the UAV 100 to wait a small amount of time for such a return than for the UAV 100, or another UAV, to be dispatched to collect a to-be-returned item at a later time. A non-limiting example of such a predetermined object is a person or animal that is not authorised and/or expected to be in the vicinity of the UAV 100. A non-limiting example of such a predetermined message is a return-to-home message generated by an automated system. For example, where the UAV 100 belongs to a fleet of UAVs 100, the UAV may be summoned to return to a home location by an automated fleet management system. Another non-limiting example of such a predetermined message is an item-dispatch message. For example, the UAV 100 may be instructed to dispatch an item, in response to which the UAV 100 takes off autonomously to deliver the item, autonomously or otherwise.

The UAV 100 may perform an autonomous take-off (and/or other autonomous procedure) fully autonomously. Alternatively, the UAV 100 may perform an autonomous procedure only partly autonomously, based on input from a human operator or based on input from another entity. For example, the human operator may provide one or more commands to the UAV 100 for use in the autonomous take-off, prior to and/or during autonomous take-off. An entity other than a human operator, for example an automated management system, may issue such a command for the UAV 100. The autonomous take-off may involve the UAV 100 taking off from a take-off surface, such as the ground, a building, water, a platform, a human hand, a vehicle, or in another manner. As such the take-off surface may be stationary or moving when the UAV 100 takes off.

The take-off may be a vertical take-off in which the UAV 100 takes off in an upward direction. A rotorcraft, for example, may be able to undertake vertical take-offs. A hybrid UAV may also be able to undertake vertical take-offs. Alternatively, the take-off may be a non-vertical take-off. For example, a fixed-wing UAV may not be able to take off vertically.

In this example, the UAV 100 comprises a sensor 105. For convenience and brevity, in this specific example the sensor 105 comprises an image capture device in the form of a camera 105, it being appreciated that the sensor 105 may be of another type. As such, unless the context indicates otherwise, all references herein to cameras are intended to be to both cameras and all other types of sensor useable in accordance with the techniques described herein.

Although, in this specific example, the UAV 100 comprises a single camera 105, in other examples the UAV 100 comprises a plurality of cameras.

The camera 105 is configurable, permanently or temporarily, in an upwards-facing configuration during an autonomous procedure, as indicated by arrow 110 in FIG. 1.

For convenience and brevity, in this specific example the autonomous procedure comprises an autonomous take-off, it being appreciated that the autonomous procedure may be of another type. As such, unless the context indicates otherwise, all references herein to autonomous take-offs are intended to be to both autonomous take-offs and all other types of autonomous procedures useable in accordance with the techniques described herein.

Where the camera 105 is temporarily configurable in the upwards-facing configuration during autonomous take-off, the camera 105 may be configured in the upwards-facing configuration for some or all of the autonomous take-off. For example, the camera 105 may be configured in the upwards-facing configuration prior to and during an initial part of the autonomous take-off, with the camera 105 being configured in a non-upwards-facing configuration during a subsequent part of the autonomous take-off. For example, the camera 105 may be configured in the non-upwards-facing configuration during the subsequent part of the autonomous take-off in response to determining that a risk of collision associated with the autonomous take-off is below a predetermined threshold level.

In the upwards-facing configuration, the field of view of the camera 105 includes airspace 115 directly above the UAV 100. As such, the UAV 100 can determine an extent to which any obstacles, objects or other external factors directly above the UAV 100 may influence or affect autonomous take-off.

The configuration of the camera 105 is 'upwards-facing' in that the camera 105 faces towards the sky, away from the centre of the Earth, and therefore may also be referred to as a 'skyward-facing' configuration. As such, the camera 105 faces a direction of take-off of the UAV 100, for example where the UAV 100 makes a vertical take-off, and so may enhance performance of an autonomous take-off compared to a forward-facing, sideways-facing, backward-facing, or downward-facing camera. The UAV 100 may comprise, and may use, one or more forward-facing, sideways-facing, backward-facing and/or downward-facing cameras during autonomous take-off, in addition to the upwards-facing camera 105. The techniques described herein in relation to an upwards-facing camera may, however, be applied to a forward-facing, sideways-facing, backward-facing and/or downward-facing camera (or other type of sensor), with references to airspace above the UAV 100 being airspace in front of, to the side of, behind and/or below the UAV 100 respectively.

The camera 105 may have a fixed or dynamic orientation with respect to the body of the UAV 100.

In some examples, the camera 105 has a fixed (or 'static') orientation with respect to the body of the UAV 100. In other words, in such examples, the orientation of the camera 105 is not adjustable (or 'variable') with respect to the body of the UAV 100. In such examples, where the orientation of the body of the UAV 100 varies, the orientation of the camera 105 varies by the same measure. The fixed orientation provides a relatively straightforward structure for the UAV 100. The fixed orientation may reduce manufacturing complexity and cost of the UAV 100 compared to a more complicated mechanism in which the orientation of the camera 105 can change with respect to the body of the UAV 100. The fixed orientation may also reduce the weight of the UAV 100 compared to a more complicated, adjustable mechanism, which in turn can increase efficiency and flight range of the UAV 100. The fixed orientation may also reduce maintenance efforts of the UAV 100 compared to a more complicated, dynamic mechanism.

In other examples, the camera 105 has an adjustable (or 'dynamic') orientation with respect to the body of the UAV 100. In other words, in such examples, the camera 105 is configurable in a first orientation and in a second, different orientation with respect to the body of the UAV 100. For example, the UAV 100 may be configured to maintain a constant orientation of the camera 105 with respect to an entity other than the body of the UAV 100 and to adjust the orientation of the camera 105 accordingly. The UAV 100 may not, in practice, maintain a perfectly constant relative orientation, but may be configured to endeavour to do so, for example by adjusting for any deviation from a predetermined orientation. The other entity, in relation to which the orientation of the camera 105 may be maintained, may, for example, be the Earth, a building or another reference object. For example, the UAV 100 may be operable to try to maintain a skywards (or 'skywards-facing') orientation of the camera 105 if the UAV 100 tilts, for example during autonomous take-off. Although, in such examples, mechanical complexity of the UAV 100 may be increased compared to a fixed-orientation configuration, the UAV 100 may be able to compensate for tilt or similar conditions during the autonomous take-off procedure thereby maintaining visibility of the airspace 115 directly above the UAV 100. For example, by adjusting the orientation in this way, the UAV 100 may more readily be able to identify common objects between different frames of video data captured by the camera 105 since they appear in the same, or at least a predictable, location in such frames. This may therefore facilitate object recognition and reduce latency in controlling the UAV 100 during autonomous take-off since potential obstacles may be identified and accounted for more readily.

Use of image stabilisation may also facilitate object recognition and autonomous take-off. The UAV 100 may be subject to tilting and the like during take-off, particularly at the initial take-off stage, for example when the UAV 100 lifts off the ground. As such, use of image stabilisation may enhance autonomous operation during take-off.

In addition to the camera 105 being configurable in the upwards-facing configuration during autonomous take-off, as explained above, the camera 105 may be configurable, permanently or temporarily, in the upwards-facing configuration in other scenarios, or in other predetermined autonomous procedures. For example, the camera 105 may be configurable in the upwards-facing configuration for an autonomous in-flight procedure, an autonomous landing procedure and/or an autonomous docking procedure. The autonomous in-flight procedure may comprise an in-flight manoeuvre in which an altitude of the UAV 100 increases, where visibility of the airspace 115 directly above the UAV 100 may be used to influence the control of the UAV 100. The autonomous landing procedure may comprise the UAV 100 autonomously landing, where such landing may be enhanced by awareness of the airspace above the UAV 100 as well as or instead of the environment below, to the side of, behind and/or in front of the UAV 100, for example in case other UAVs also intend to land in the same area as the UAV 100. The autonomous docking procedure may comprise the UAV 100 coming into physical contact with another physical object, such as another UAV, a charging point, an object to be repaired and/or a package to be delivered. As such, the UAV 100 can take into account activity in the airspace 115 directly above the UAV 100 in multiple scenarios.

The camera 105 may be configured in the upwards-facing configuration in anticipation of an imminent autonomous take-off, for example following successful delivery of a product.

The camera 105 as described herein is an image capture device that is arranged to capture image data. The image data may comprise still image data and/or video data. For example, the UAV 100 may be operable to capture a still image of a scene directly above the UAV 100 prior to and/or during autonomous take-off and to use the captured still image to control at least part of the autonomous take-off procedure. Using a still image may result in relatively low complexity, compared to using video data, since a relatively small amount of data is processed. However, the use of video data allows the UAV 100 to react and adapt to environmental changes during autonomous take-off, albeit with an increase in complexity compared to the use of a still image. The UAV 100 may be arranged to use a combination of still image data and video data during autonomous take-off. For example, the UAV 100 may be arranged to capture of the still image of the scene directly above the UAV 100 prior to commencing autonomous take-off, for example to determine initial control parameters, and may start capturing and processing video data in response to a trigger event. Examples of such a trigger event include, but are not limited to, detecting a potential collision during autonomous take-off, expiry of a predetermined timer following commencement of the autonomous take-off and/or reaching a given height above the ground.

The camera 105 may be arranged to capture electromagnetic radiation in the visible spectrum and to output data based on such captured electromagnetic radiation. The visible spectrum is the part of the electromagnetic spectrum that is visible to the human eye and corresponds to wavelengths of around 390 nanometres (nm) to around 700 nm. Electromagnetic radiation in the visible spectrum is also referred to as 'visible light' or 'light'. By capturing visible light, the camera 105 allows the UAV 100 to distinguish between different colours. This may facilitate object recognition and autonomous operation of the UAV 100. For example, the UAV 100 may be able to disambiguate between different objects based on their colour profiles.

The camera 105 may be arranged to capture electromagnetic radiation in the infrared spectrum and to output data based on such captured electromagnetic radiation. A camera arranged to capture infrared may be known as an 'infrared camera', 'infrared sensor', 'thermographic camera' or a 'thermal imaging camera'. Infrared (or 'IR') is different from visible light. Infrared has a longer wavelength than that of visible light, around 700 nm to around 1,000,000 nm, and is not visible to the human eye. An infrared camera may be used to capture data that can be used to generate a temperature profile, for example by assigning different colours to different temperatures. Non-contact thermal measurement (or 'thermometry') may be used, for example, for building diagnostics, firefighting, detecting excessive heating, and search and rescue. By capturing infrared, the camera 105 allows the UAV 100 to distinguish between objects having different temperatures. This may facilitate object recognition and autonomous operation of the UAV 100. For example, the UAV 100 may be able to disambiguate between different objects based on their temperature profiles. Use of an upward-facing infrared camera is different from use of a forward-looking infrared (FLIR) camera at least in terms of the field of view. In an example scenario, the UAV 100 may use an upwards-facing infrared camera to inspect thermal properties of a ceiling of a building from within the building.

The camera 105 may be arranged to capture visible light only, infrared only, or visible light and infrared.

A camera arranged to capture visible light may have a greater operating range than a camera arranged to capture infrared light. As such, visible light and infrared camera may be used to detect objects at different distances from the UAV 100.

A camera arranged to capture visible light may have a greater field of view than a camera arranged to capture infrared light. As such, visible light and infrared camera may be used to detect objects at different viewing angles from the UAV 100.

A camera arranged to capture visible light may operate more effectively in different operating environments than a camera arranged to capture infrared light. For example, a camera arranged to capture visible light may operable well with well-lit surfaces with clear patterns, whereas a camera arranged to capture infrared may operate well with highly reflective surfaces. As such, visible light and infrared camera may be used to detect different types of object having different types of surfaces.

The camera 105 is operatively coupled to a controller 120, for example via a bus. Although, in this example, the UAV 100 comprises a single controller 120, a UAV can comprise more than one controller.

The controller 120 may be embodied in hardware and/or software. The controller 120 is operable to control one or more components, modules, functions and/or operations of the UAV 100. The controller 120 may, amongst other things, allow the UAV 100 to operate autonomously. The controller may be arranged to execute computer-readable instructions comprised in a computer program and, thus, to cause the techniques described herein to be performed.

The controller 120 is arranged to receive data based on the image data captured by the camera 105. The data based on the captured image data may comprise the image data captured by the camera 105 and/or data derived from the captured image data. The controller 120 may be arranged to receive the data based on the captured image data from the camera 105 directly and/or indirectly via one or more intermediate entities. Such an intermediate entity may, for example, process the captured image data and output data based on a result of the processing. For example, the intermediate entity may be an object-recognition component, module or function that is arranged to perform object-recognition based on the captured image data and to output data relating to any object(s) identified in the captured image data to the controller 120.

The controller 120 may therefore provide computer-vision functionality to the UAV 100 using the received data.

The controller 120 is operatively coupled to an actuator 125, for example via a bus. Although, in this specific example, the UAV 100 has a single actuator 125, a UAV may comprise more than one actuator of one or more different types.

An example of an actuator 125 is a speed controller arranged to control the speed of the UAV 100. For example, the speed controller may be arranged to control the rotation rate of one or more rotors of the UAV 100. Another example of an actuator 125 is a loudspeaker controller arranged to control a loudspeaker of the UAV 100. Another example of an actuator 125 is a display device controller arranged to control a display device of the UAV 100. Another example of an actuator 125 is an alert controller arranged to cause an alert to be generated to alert an entity to the presence of the UAV 100. The alert controller may use a loudspeaker and/or display device of the UAV 100 to generate the alert.

The controller 120 is arranged to control the actuator 125 based on the data received from the camera 105 which, as explained above, may be the image data captured by the camera 105 and/or data derived from the captured image data. The controller 120 may be arranged to control the actuator 125 based on further data in addition to the received data. An example of such further data is command data received from a remote human operator and/or an entity other than a remote human operator. Another example of such further data is data received from an object within the field of view of the camera 105 via a communication channel (for example a secondary communication channel) between the UAV 100 and the object.

The data received from the object may identify a unique identifier of the object, as is described in more detail below. The data received from the object may identify an attribute of the object, as is described in more detail below. The data received from the object may identify a request from the object. For example, the data may request that the UAV 100 avoid collision with the object.

The controller 120 may be operable to identify one or more attributes associated with one or more objects within the field of view of the camera 105 and to control the actuator 125 based on the identified one or more attributes of the one or more objects.

By taking into account the attribute(s) associated with the object(s), control of the UAV 100 during an autonomous take-off procedure, and other procedures, may be enhanced. For example, the UAV 100 may determine whether and, if so, to what extent, the autonomous take-off procedure object(s) should be modified in view of the presence or absence of the object(s).

An example of an identifiable attribute associated with the object within the field of view of the camera 105 is a size of the object. The UAV 100 may determine, for example, whether a take-off path should be modified to avoid the object based on the size of the object. Determining the size of the object may also facilitate object recognition, for example by helping to disambiguate between different candidate objects based on their sizes.

Another example of an identifiable attribute associated with the object within the field of view of the camera 105 is an absolute location of the object. The absolute location of the object is the absolute location of the object in space, for example represented by a set of coordinates. The UAV 100 may for example know that it is to travel along a particular course during the take-off procedure and may be able to determine whether or not the object is located along that particular course by knowing the absolute location of the object. The UAV 100 may determine the absolute location of the object by receiving data indicative of the absolute location of the object. The UAV 100 may receive such data from the object, or otherwise.

Another example of an identifiable attribute associated with the object within the field of view of the camera 105 is a relative location of the object. The relative location may be relative to the UAV 100 and/or to another entity. The UAV 100 may be able to determine a collision risk based on the relative location. The UAV 100 may be able to adjust its flight path to avoid collision with the object based on knowing the location of the object relative to the location of the UAV 100.

Another example of an identifiable attribute associated with the object within the field of view of the camera 105 is an object type of the object. Determining the object type of the object allows the UAV 100 to adapt the autonomous take-off procedure based on the nature of the object. For example, the UAV 100 may be configured to avoid collision with predetermined types of objects. Examples of such predetermined types of objects may include, but are not limited to, other aircraft, washing lines, power lines, parts of buildings and birds. The UAV 100 may be configured to make physical contact with, or approach, other predetermined types of object, for example physical and/or wireless charging points, an object the UAV 100 is to repair, inspect etc.

Another example of an identifiable attribute associated with the object within the field of view of the camera 105 is a distance of the object from the UAV 100. The UAV 100 may be able to determine a collision risk based on the distance between the object and the UAV 100. The UAV 100 may be configured to maintain at least a threshold separation between the UAV 100 and the object. The threshold separation may be adjustable. For example, a human operator may be able to set different threshold separation values, for example based on how close they would like to allow the UAV 100 to fly to other objects. The threshold separation may be adjustable before and/or during autonomous take-off. For example, it may not be possible to complete autonomous take-off in a confined space based on a last-used used and/or default threshold separation value as the UAV 100 may need to fly closer to an obstacle to be able to complete the autonomous take-off. The threshold separation value may be reduced, for example by a remote human operator, to allow the UAV 100 to complete the take-off. The UAV 100 may be configured to transmit a request for adjustment of the threshold separation value, for example to a remote-control device of the remote human operator and/or another entity, and may be configured to modify the threshold separation value in response to acceptance of the request, for example by the remote human operator and/or another entity. The request may specify the requested new threshold separation value and/or the new threshold separation value may be specified in the response to the request.

The UAV 100 may be configured to determine the distance between the UAV 100 and the object on multiple occasions, for example periodically or intermittently. The UAV 100 may be arranged to modify the autonomous take-off procedure where the rate of change of distance exceeds a threshold value.

Another example of an identifiable attribute associated with the object within the field of view of the camera 105 is a speed of travel of the object. The UAV 100 may use the speed of travel of the object to better determine a risk of collision with the object. For example, the UAV 100 may determine that the other object is travelling sufficiently slowly or quickly that the UAV 100 may continue with its planned course for autonomous take-off with a sufficiently low risk of collision with the object.

Another example of an identifiable attribute associated with the object within the field of view of the camera 105 is a direction of travel of the object. The UAV 100 may use the direction of travel of the object to better determine a risk of collision with the object. For example, the UAV 100 may determine that the other object is travelling away from the UAV 100 such that the UAV 100 may continue with its planned course for autonomous take-off with a sufficiently low risk of collision with the object.

Another example of an identifiable attribute associated with the object within the field of view of the camera 105 is a risk of collision of the UAV with the object. The UAV 100 may determine whether or not a planned course for the autonomous take-off should be adapted to avoid collision with the object. The UAV 100 may be configured to make this determination where the risk of collision with the object exceeds a threshold level.

Another example of an identifiable attribute associated with the object within the field of view of the camera 105 is a unique identifier associated with the object. The identifier may allow the UAV 100 to determine a further attribute of the object, for example, the type and/or size of the object. The UAV 100 may determine the further attribute by performing a look-up using the unique identifier of the object. The UAV 100 may receive the unique identifier from the other object or otherwise.

The controller 120 may be operable to identify the attribute associated with the object based on the data received from the camera 105 and/or based on other received data. The other received data may be received from the object or otherwise.

The controller 120 may be configured to control the actuator 125 to avoid physical interaction between the UAV 100 and the object. This reduces the risk of damage to the UAV 100 and/or the other object. Collision avoidance may involve a change of speed of the UAV 100 (for example speeding up, slowing down or hovering), changing a direction of travel (for example to navigate above, below, or around the object) and/or aborting the autonomous take-off, permanently or temporarily. The UAV 100 may notify another entity of any changes to a planned flight path, for example by transmitting one or more notifications wirelessly before, during and/or after take-off. Examples of the other entity include, but are not limited to, a remote human operator and an owner of the UAV 100.

The controller 120 may be configured to control the actuator 125 to cause physical interaction between the UAV 100 and the object. It may, in some scenarios, the UAV 100 may interact with the object during take-off, for example to dock temporarily with the object, to transmit power to the object and/or to receive power from the object. Power may be provided to and/or received from the object wirelessly or via physical contact. The UAV 100 may interact with the object during an autonomous procedure other than an autonomous take-off.

The UAV 100 may be configured to search for the object. For example, the UAV 100 may be provided with data identifying the object and the UAV 100 may be configured to seek out the object based on the identifying data. Examples of identifying data include, but are not limited to, visual representation data and location data. The identifying data may be received from a remote human controller and/or another entity.

As explained above, the UAV 100 may be configured to perform one or more predetermined tasks in relation to the object.

The UAV 100 may be configured to identify one or more defects with the object. Defect-identification is an example of such a predetermined task. Examples of defects include, but are not limited to, cracks, water damage and corrosion.

The UAV 100 may be configured to repair the one or more defects. Defect-repairing is another example of such a predetermined task.

The UAV 100 may comprise one or more components that can be used to perform one or more predetermined tasks. For example, the UAV 100 may comprise one or more components that can repair the one or more defects. For example, the UAV 100 may comprise one or more robotic arms that can be used to repair the one or more defects.

Where the UAV 100 comprises one or more robotic arms, the one or more robotic arms may be used to perform one or more predetermined tasks associated with the object. Although a specific example of repairing one or more defects is provided, it will be understood that the one or more robotic arms may be used to perform another predetermined task, as an alternative to or in addition to repairing one or more defects. For example, the robotic arm(s) may be useable to inspect an object, to move an object etc.

The UAV 100 may be configured to store and/or transmit defect type data indicating a defect type of the one or more defects. The UAV 100 may, for example, record a defect type and return to a base to obtain a component useable to perform a predetermined task (for example repairing) in relation to the defect(s). The defect type data may enable the UAV 100 to obtain the correct component for the type(s) of defect(s) detected.

The UAV 100 may be configured to store and/or transmit defect location data indicating a defect location of the one or more defects. The UAV 100 and/or a different UAV, may use the defect location data to return to the location of the defect, for example to perform a predetermined task (for example repairing) in relation to the defect(s). Where, for example, the UAV 100 identifies a defect and flies to another location, for example to recharge, the UAV 100 can reliably return to the location of the defect(s) without having to search for the defect again.

In an example scenario the object is a light bulb and the UAV 100 is deployed to change the light bulb. As such, the UAV 100 may physically interact with the light bulb to remove the light bulb. The UAV 100 may replace the removed light bulb with another light bulb. The light bulb may be in a residential building, a commercial building, a lamppost etc. The UAV 100 may be authorised to perform a predetermined action in exchange for changing the light bulb. For example, the predetermined action may comprise the UAV 100 being authorised to receive energy from the lamppost. Such a UAV 100 may provide quicker, more cost-effective, more convenient, and safer changing of a light bulb than where a light bulb is changed by a human. This may be the case where, for example, the light bulb is out-of-reach of a human and would involve the use of a high and/or unsteady ladder, expensive scaffolding, closure of or disruption to traffic to change a streetlight etc.

In another example scenario, the object is a ceiling and the UAV 100 is deployed to inspect and/or repair the ceiling. For example, the UAV 100 may inspect the ceiling. Inspecting the ceiling may comprise applying a force to the ceiling to assess the structural stability of the ceiling and whether, for example, all or part of the ceiling should be replaced or may be repaired. Alternatively or additionally, inspecting the ceiling may comprise looking for cracks in the ceiling. Repairing the ceiling may comprise filling detected cracks with filler material.

In another example scenario, the object is a ceiling and the UAV 100 is deployed to paint the ceiling. For example, the UAV 100 may spray, brush and/or roll paint onto the ceiling.

In another example scenario, the object is a bridge and the UAV 100 is deployed to inspect and/or repair the bridge. For example, the UAV 100 may inspect an underside of the bridge. An underside of a bridge may be more difficult for a human to inspect than its upper surface and sides. However, the UAV 100 may be deployed to inspect any part of a bridge, for example if the bridge is in a rural location. Inspecting the bridge may comprise capturing image data of the bridge, non-destructive testing (NDT). Repairing the bridge may comprise repairing defects in the bridge.

In another example scenario, the object is a pipeline and the UAV 100 is deployed to inspect and/or repair the pipeline. The UAV 100 may inspect and/or repair an exterior of the pipeline and/or an interior of the pipeline. For example, the UAV 100 may inspect and/or repair an underside of the pipeline and/or a roof of the pipeline. Use of the UAV 100 to inspect and/or repair the pipeline, compared to use of a human, may be particularly efficient where the pipeline is in a remote location, a difficult-to-access location, is small etc. Repairing the pipeline may comprise repairing defects in the pipeline.

In another example scenario, the object is a telecommunications mast and the UAV 100 is deployed to inspect and/or repair the telecommunications mast. A telecommunications mast is generally a tall object. The UAV 100 can fly to the part(s) of the telecommunications mast to be inspected and/or repaired, whereas human inspection and/or repair may involve use of a ladder, scaffolding, an aerial work platform etc.

In another example scenario, the object is an overhead wire and the UAV 100 is deployed to inspect and/or repair the overhead wire. Overhead wires are generally out of reach from the ground. The UAV 100 can fly to the part(s) of the overhead wire to be inspected and/or repaired, whereas human inspection and/or repair may involve use of a ladder, scaffolding, an aerial work platform etc.

In another example scenario, the object is an offshore platform (or 'offshore rig') and the UAV 100 is deployed to inspect and/or repair the offshore platform. The offshore platform may be an offshore oil platform, an offshore gas platform etc. The UAV 100 may be configured to perform underdeck inspection of the offshore platform. In addition to comprising a sensor configurable in an upwards-facing configuration, the UAV 100 may comprise a sensor configurable in a downwards-facing configuration such that a field of view of the sensor that is configurable in a downwards-facing configuration includes airspace directly below the UAV. The sensor that is configurable in a downwards-facing configuration may be used to detect water or other objects below the UAV 100 while the UAV 100 performs the underdeck inspection. For example, the UAV 100 may be configured to avoid entering the water below the offshore platform by using the sensor that is configurable in a downwards-facing configuration. The UAV 100 may facilitate underdeck inspection compared to, for example, use of scaffolding, rope access work, over-side work, etc.

In another example scenario, the object is power and/or petrochemical equipment and the UAV 100 is deployed to inspect and/or repair the power and/or petrochemical equipment. Such equipment can be especially dangerous and/or difficult for a human to inspect.

In some example, the UAV 100 comprises Intrinsic Safety (IS) protection. IS protection limits the energy available for ignition. In such examples, the UAV 100 is especially effective in environments with hazardous gasses and/or dust. Examples of such environments include, but are not limited to, petrochemical refineries and mines.

In another example scenario, the object is part of the natural environment and the UAV 100 is deployed to inspect and/or repair the part of the natural environment. For example, the object may be an overhang rock formation, a ceiling of a cave etc. Such objects may be difficult for a human to access.

In another example scenario, the object is a window in an atrium and the UAV 100 is deployed to inspect and/or repair and/or clean the window. The window may be in the form of a glass roof, a skylight etc. Such a window may be difficult for a person to clean where the window is a long way above the ground.

In another example scenario, the object is a ship and the UAV 100 is deployed to inspect and/or repair and/or clean the ship. For example, the UAV 100 may be deployed to inspect and/or repair and/or clean the hull of the ship. The UAV 100 may be deployed while the ship is out of the water, or while the ship is in water.

In another example scenario, the object is a storage tank and the UAV 100 is deployed to inspect and/or repair and/or clean the storage tank. Storage tanks can be difficult for a person to access and can be particularly hazardous environments.

In another example scenario, the object is a silo and the UAV 100 is deployed to inspect and/or repair and/or clean the silo.

In another example scenario, the object is a wind turbine and the UAV 100 is deployed to inspect and/or repair and/or clean the wind turbine. Wind turbines generally have parts that are out-of-reach from the ground. The UAV 100 may facilitate inspection of a wind turbine by flying to the relevant part(s).

In another example scenario, the object is a chimney and the UAV 100 is deployed to inspect and/or repair and/or clean the chimney.

In another example scenario, the object is a theme park ride and the UAV 100 is deployed to inspect and/or repair and/or clean the theme park ride.

In another example scenario, the object is a tunnel and the UAV 100 is deployed to inspect and/or repair the tunnel. The tunnel may be a railway tunnel. Which may be above ground or underground. The tunnel may, alternatively or additionally, be a road tunnel. A roof of a tunnel can difficult for a human to inspect. For example, a human may not be able to use rope access to inspect the roof of a tunnel. Although scaffolding may be used to enable a human to inspect the roof of the tunnel, doing so may involve closing the tunnel to traffic, limiting inspection work to times when the tunnel is not being used (for example a few hours in the early morning) etc. Repairing the tunnel may comprise repairing defects, such as cracks, in the tunnel.

Where the object is a railway tunnel, the UAV 100 may be configured to perform one or more predetermined actions in response to one or more railway-related trigger events. An example of a trigger event is determining that a train is approaching.

The UAV 100 may be able to determine that a train is approaching by recognising the sound of an approaching train. For example, where the UAV 100 comprises a microphone, the UAV 100 may be configured to use the microphone to listen for approaching trains while the UAV 100 is operating in the tunnel. The UAV 100 may compare audio data captured via the microphone to pre-stored data representing the sound of a train to enable the approaching of the train to be recognised. The UAV 100 may be able to recognise the direction of approach of the train, for example where the UAV 100 comprises an array of microphones. The UAV 100 may be able to determine that a train is approaching by detecting light from the train. Where the tunnel is normally dark, the UAV 100 may be configured to monitor for increasing light levels while operating in the tunnel.

The UAV 100 may be able to determine that a train is approaching by detecting the train in captured image data. For example, where the tunnel has acceptable light levels, the UAV 100 may be able to recognise a train in image data captured by a sideways-facing, forward-facing and/or backwards-facing camera.

The UAV 100 may be able to determine that a train is approaching by accessing a timetable indicating when the train is likely to pass through the tunnel. This may enable to relatively uncomplicated UAV 100 to be provided, but depends on the reliability of the timetable.

The UAV 100 may be able to determine that a train is approaching by receiving a signal from the train. For example, the train may broadcast a beacon while it travels through the tunnel, which can be recognised by the UAV 100 as indicating that the train is approaching.

An example of a predetermined action the UAV 100 may perform in response to one or more railway-related trigger events is to fly to a safe area (or 'refuge') in the tunnel. Some tunnels have safe areas at intervals along the length of the tunnel. The UAV 100 may fly to such a safe location to move out of the way of the train. The UAV 100 may store safe area location data indicating safe area locations in the tunnel and use such safe area location data to locate a safe area. The UAV 100 may generate the safe area location data. For example, the UAV 100 may generate the safe area location data by flying through at least part of the tunnel and creating the safe area location data accordingly, the UAV 100 may receive the safe area location data from a safe area location data source etc. Alternatively or additionally, a safe area may transmit a safe area beacon, which the UAV 100 can use to locate the safe area.

Another example of a predetermined action the UAV 100 may perform in response to one or more railway-related trigger events is to fly out of the tunnel. This may be effective where the UAV 100 is close to an entrance of the tunnel.

As such the UAV 100 may have a fly-to-safety (FTS) feature. The FTS feature may enable the UAV 100 fly from an unsafe situation, such as an approaching train. However, the FTS feature may be used in other unsafe scenarios.

In another example scenario, the object is a vehicle and the UAV 100 is deployed to inspect and/or repair the vehicle. For example, the UAV 100 may deployed to inspect the underside of a vehicle for suspicious items, damage etc. Inspecting the underside of a vehicle for suspicious items can be error-prone and inspecting the underside of a vehicle for damage may involve raising the vehicle off the ground for a human to survey the underside of the vehicle.

In another example scenario, the object is a loft (or 'attic') hatch and the UAV 100 is deployed to open the loft hatch. The UAV 100 may interact with a catch mechanism on the loft hatch to open the loft hatch. The UAV 100 may fly into the loft once the loft hatch is open. For example, the UAV 100 may fly into the loft to retrieve an item. Opening of a loft generally involves use of a specialist tool and can be inconvenient and/or difficulty given the general height of loft hatches, particularly for people with limited mobility, in buildings with loft hatches in inconvenient locations. Further, the UAV 100 can save time by retrieving an item from the loft.

In another example scenario, the object is a fruit tree and the UAV 100 is deployed to inspect the fruit tree and/or inspect the fruit and/or pick the fruit. Such inspection and/or picking can be time-consuming and can result in fruit being picked too early or late such that the fruit is wasted. The UAV 100 may be able to perform these tasks more effectively than a human.

In another example scenario, the object is an attachment point and the UAV 100 is deployed to attach to the attachment point. As such, the UAV 100 may be able to hang from the attachment point, for example to conserve energy compared to hovering and to be out-of-reach compared to resting on the ground. The UAV 100 may be configured to serve as a fan while the UAV 100 is attached to the attachment point. For example, where the UAV 100 comprises a rotorcraft, the UAV 100 may be able to provide a downwards airflow to serve as a ceiling fan. The UAV 100 may be configured such that the rotor(s) rotate at a slower rate when the UAV 100 serves as a ceiling fan than when the UAV 100 is in-flight. Although a ceiling fan may provide more effective circulation than the UAV 100, the UAV may nevertheless provide some degree air circulation. The UAV 100 may be powered by an external power source while the UAV 100 serves as a ceiling fan.

In this example, the UAV 100 comprises memory 130. The memory 130 may store a computer program comprising computer-readable instructions, which can be executed by the controller 120 as described above.

The UAV 100 may be configured to store at least some of the captured image data and/or at least some of the received data in the memory 130 of the UAV 100. Storing such data in the memory 130 may assist in auditing of actions and/or decisions taken by the UAV 100 when operating autonomously, for example during autonomous take-off.

The UAV 100 may be configured to discard the at least some of the captured image data and/or at least some of the received data in response to a trigger event. The trigger event may be successful completion of the autonomous take-off procedure. This allows a trade-off between making efficient use of limited on-board memory 130 while allowing potentially useful data to be stored, for example for auditing purposes. Efficient storage may be especially relevant where there is a significant amount of captured data, for example where there are multiple cameras and/or where there is high-resolution image data. For example, the UAV 100 may be arranged to store the data relating to the autonomous take-off if the procedure is not successful. However, the UAV 100 may be configured to discard stored data relating to a successful autonomous take-off on successful completion of the take-off to free up storage space in the memory 130.

The UAV 100 may comprise one or more further components, modules and/or functions not depicted in FIG. 1. Examples of such further components modules and/or functions include, but are not limited to, one or more rotors, one or more power supplies, one or more data communications interfaces, one or more microphones, one or more loudspeakers, one or more lights, one or more display devices and one or more image stabilisers. The one or more lights may be used, for example, to illuminate an object within the field of view of the camera 105 to facilitate object identification and thereby to enhance the effectiveness of operation in the autonomous take-off procedure. As such, the light(s) may be upwards-facing so as to illuminate objects within the field of view of the camera 105.

Figure 2:
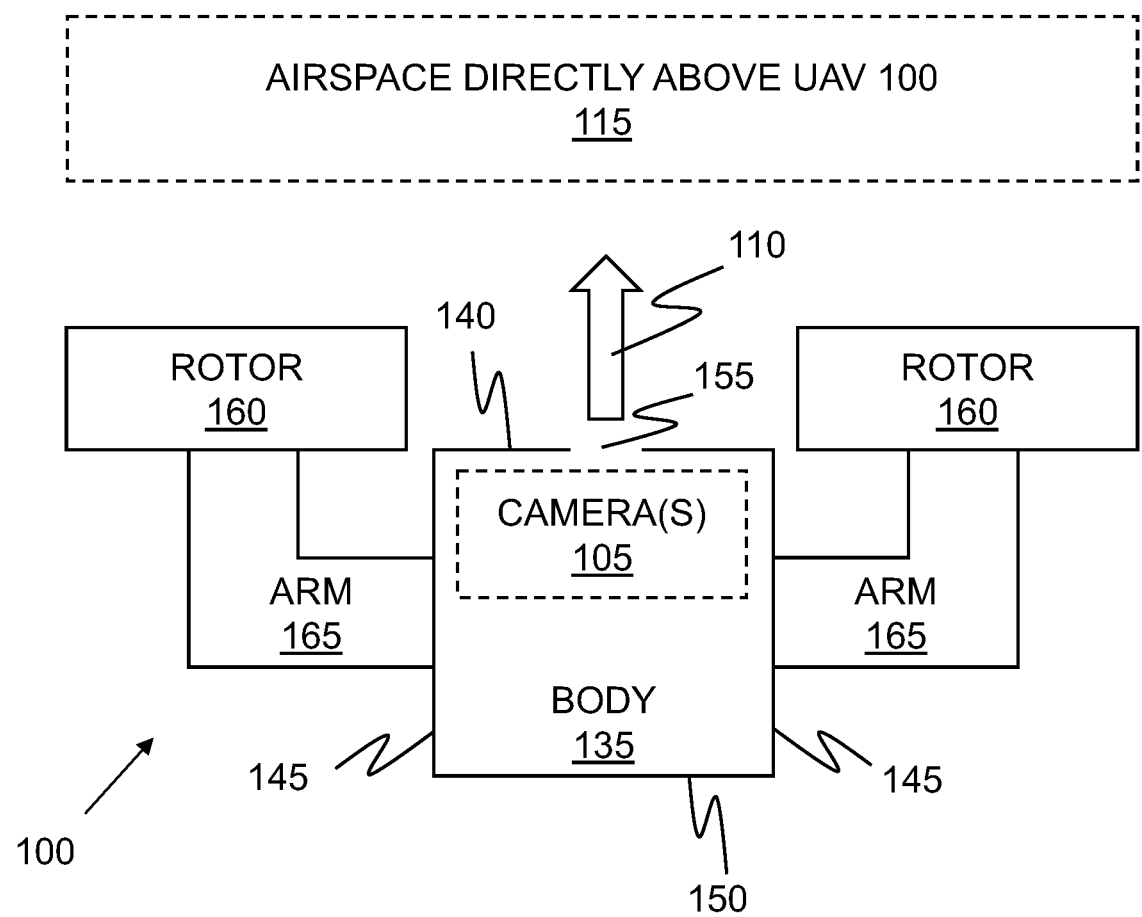
FIG. 2 shows schematically a front view of another example UAV in accordance with embodiments.
Figure 3:
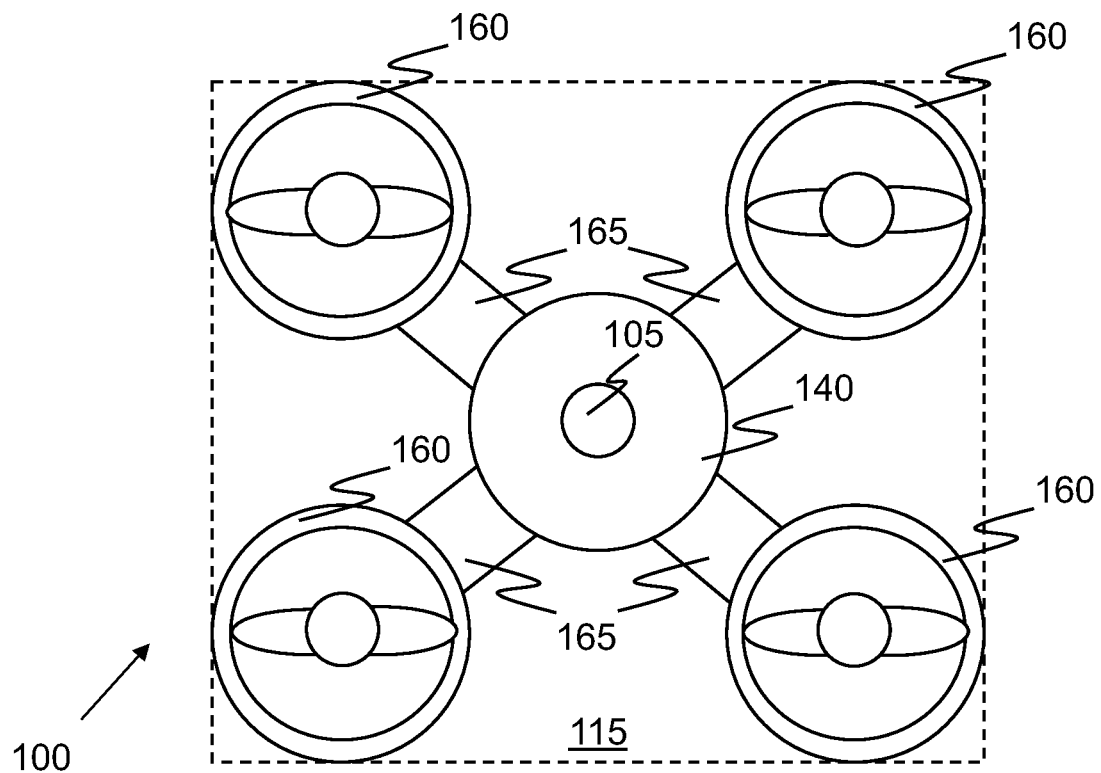
FIG. 3 shows schematically a plan view of the example UAV shown in FIG. 2.

Referring to FIGS. 2 and 3, there is shown schematically an example of a UAV 100.

As depicted in FIG. 2, the UAV 100 comprises a body 135. In this example, the body 135 of the UAV 100 has an upper (or 'top') surface 140, side surfaces 145 and a lower (or 'bottom') surface 150. The body 135 of the UAV 100 may comprise one or more upper surfaces, one or more side surfaces and one or more lower surfaces.

In this example, the camera 105 is at least partly located within the body 135 of the UAV 100 and is configurable to capture image data through an opening 155 in the body 135 of the UAV 100. In this example, the opening 155 is in the upper surface 140 of the body 135 of the UAV 100. Locating the camera 105 at least partly within the body 135 may improve aerodynamic properties of the UAV 100 compared to providing the camera 105 on an exterior of the UAV 100. The camera 105 may be permanently or temporarily configured to capture image data through the opening 155 in the body 135 of the UAV 100.

In some examples, the camera 105 is not mounted on a gimbal. This may provide a relatively uncomplicated structure where, for example, the orientation of the camera 105 is fixed relative to the UAV 100 and therefore where angular variation of the camera 105 relative to the body of the UAV 100 is not used.

In this example, the camera 105 is configurable to protrude through the opening 155 in the body 135 of the UAV 100. The camera 105 may be permanently or temporarily configured to protrude through the opening 155 in the body 125 of the UAV 100. For example, the camera 105 may be configured to protrude through the body 125 when the camera 105 is in use and not to protrude through the body 125 when the camera 105 is not in use. When not in use, the camera 105 may be covered, for example under the control of the controller 120. Since the camera 105 is upwards-facing, it may be particularly susceptible to damage, water coverage and/or dirt. Protecting the camera 105 when not in use may therefore improve performance when the camera 105 is use.

In this example, the UAV 100 comprises rotors 160, which are connected to the body 135 of the UAV 100 by respective arms 165.

In some examples, the field of view of the camera 105 does not include any part of any rotor 160 of the UAV 100. This may facilitate autonomous operation of the UAV 100 since the captured image data may exclude image data associated with the rotors 160. By configuring the UAV 100 in this way, the image data obtained by the camera 105 may be free from known and nearby objects that are part of the UAV 100 and which may otherwise be mistaken to be objects that should be avoided during take-off.

In some examples, the field of view of the camera 105 includes at least part of a rotor 160 of the UAV 100. In some examples, the controller 100 is configured to take into account that the field of view of the camera 105 includes the at least part of the rotor 160 of the UAV 100 in controlling the actuator 125. For example, the controller 120 may be configured to disregard or filter out image data corresponding to the at least part of the rotor 160. If such processing were not performed, the controller 120 might incorrectly interpret the presence of the rotor 160 as a nearby object to be avoided, which may affect the accuracy of the autonomous take-off procedure. As indicated above, the camera 105 may alternatively be arranged such that its field of view does not include any part of any rotor 160 of the UAV 100, in which case such post-processing to ignore the rotor 160 may not be used. However, the overall size of the UAV 100 may be smaller and/or the overall field of vision of the UAV 100 may be greater where the field of view of the camera 105 includes at least part of the rotor 160.

Figure 4:
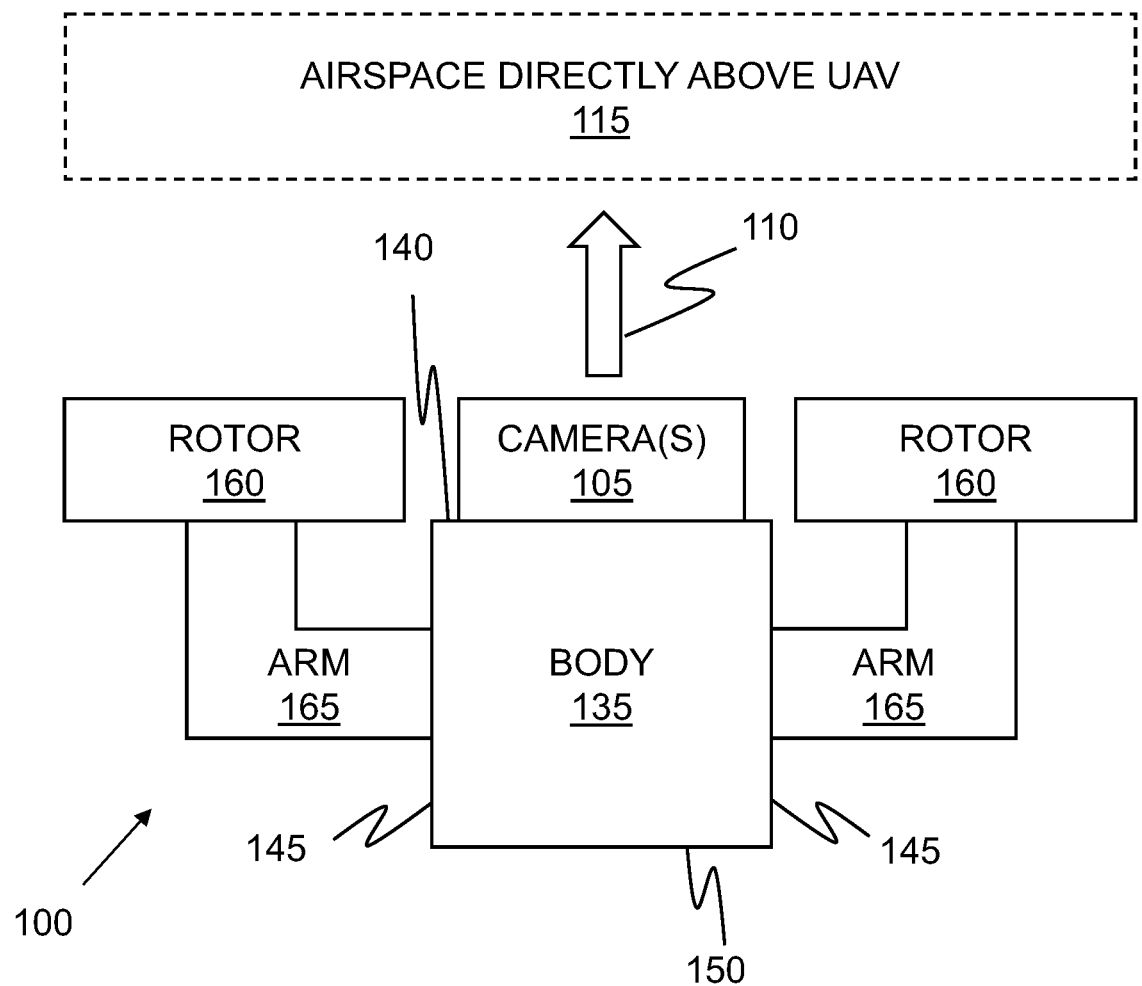
FIG. 4 shows schematically a front view of another example UAV in accordance with embodiments.

Referring to FIG. 4, there is shown schematically an example of a UAV 100.

In this example, the camera 105 is mounted on the upper surface 140 of the body 125 of the UAV 100. The camera 105 may be mounted on a gimbal on the upper surface 140 of the body 135 of the UAV 100. The camera 105 is mounted on the upper surface 140 of the body 125 may facilitate removal of the camera 105 from the UAV 100, for example for repair, replacement and/or upgrade. Mounting the camera 105 on top of the body 125 may also facilitate retrofitting of the camera 105 and application of the techniques described herein to a UAV that does not have an internal and upwards-facing camera 105. However, mounting the camera 105 on the upper surface 140 of the body 125 may increase air resistance and decrease aerodynamic properties of the UAV 100 compared to a configuration in which the camera 105 is located at least partly within the UAV 100.

Although, in this example, the camera 105 is mounted on the upper surface 140 of the body 125 of the UAV 100, the camera 105 may be mounted on the lower surface 150 of the UAV 100. Even where the camera 105 is mounted on the lower surface 150 of the UAV 100, the field of view of the camera 105 may still include airspace directly above the UAV 100.

Figure 5:
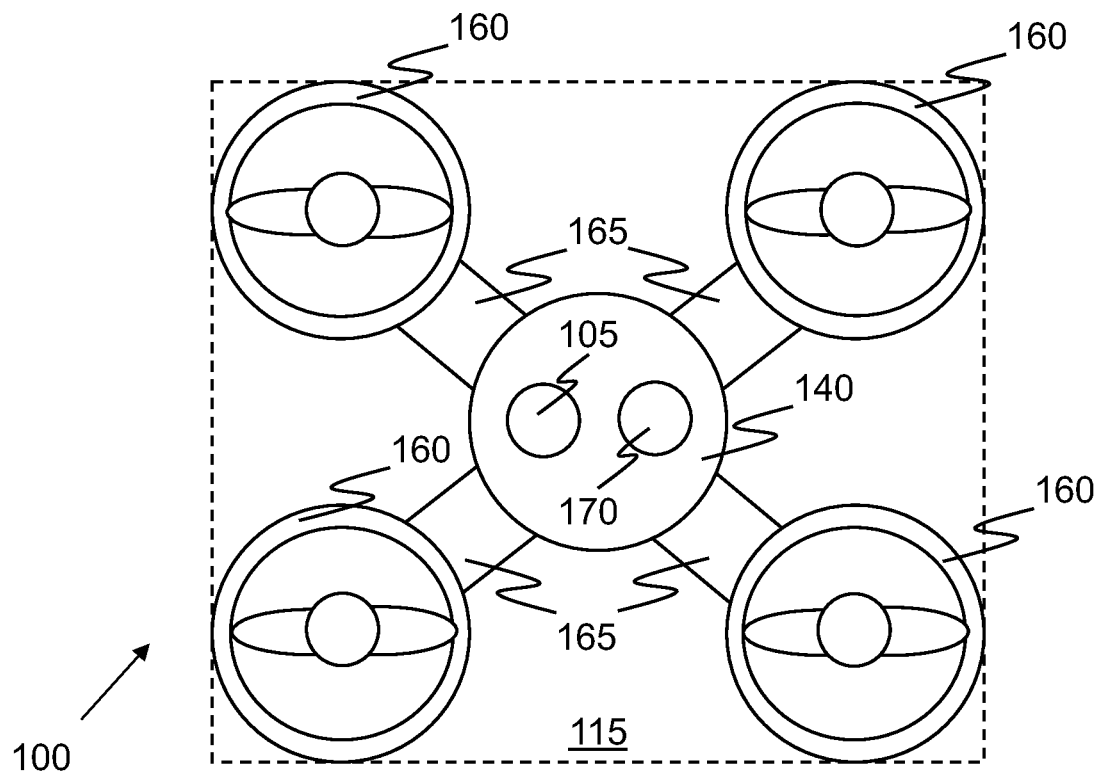
FIG. 5 shows schematically a plan view of another example UAV in accordance with embodiments.

Referring to FIG. 5, there is shown schematically an example of a UAV 100.

In this example, the UAV 100 comprises a further camera 170 having a further field of view. The further camera 170 may be arranged to capture radiation in the same or a different portion of the electromagnetic spectrum as that captured by the camera 105. For example, both the camera 105 and the further camera 170 may be arranged to capture visible light.

The further camera 170 may be configurable in an upwards-facing configuration such that the further field of view of the further camera 170 includes the airspace 115 above the UAV 100 that is also within the field of view of the camera 105. The further camera 170 may provide redundancy in case of failure of the camera 105, thereby increasing robustness of the UAV 100.

The camera 105 and the further camera 170 may be operable as a stereo camera pair to produce stereoscopic image data. The use of stereoscopic image data may further enhance performance of the UAV 100 during autonomous take-off by allowing the UAV 100 to a build 3-dimensional (3D) or volumetric representation of the fields of view of the camera 105 and the further camera 170, and any objects therein.

In some examples, the further camera 170 is configurable such that the further field of view of the further camera 170 does not include the airspace 115 above the UAV 100. The further camera 170 may, in such examples, be able to provide image data to the controller 120 of the UAV 100 to allow the UAV 100 to base control decisions for autonomous take-off on the presence or absence of any objects in a wider field of view. As such, objects that may not be visible to the camera 105 may also be taken into account. Although the further camera 170 may be configurable such that the further field of view of the further camera 170 does not include the airspace 115 above the UAV 100, the further camera 170 may also be configurable such that the further field of view of the further camera 170 does include the airspace 115.

In some examples, the further camera 170 is not configurable such that the further field of view of the further camera 170 includes the airspace 115 above the UAV 100 that is within the field of view of the camera 105. The further camera 170 may, in such examples, provide image data that is not used during autonomous take-off, but may be used for one or more other predetermined autonomous procedures.

Various measures (for example UAVs, controllers, methods, computer programs and computer-readable media) are provided in which a UAV comprises a camera, a controller and an actuator. The UAV is operable in an autonomous mode in which the controller is arranged to receive data based on image data captured by the camera and to control the actuator during an autonomous take-off procedure based on the received data. The camera is configured in an upwards-facing configuration during the autonomous take-off procedure such that a field of view of the camera includes airspace directly above the UAV during the autonomous take-off procedure. As such, autonomous take-off is made more effective, more efficient and safer since the UAV can take into account the airspace above the UAV during take-off.

The camera may be arranged to capture light in the visible spectrum. This can facilitate autonomous take-off in certain conditions, scenarios and environments, for example where there are reasonable lighting levels (for example outdoors), where colour differentiation is used, where objects and surfaces to be avoided are at a relatively large distance from the UAV and/or where relatively large fields of vision are used.

The camera may alternatively or additionally be arranged to capture infrared. This can facilitate autonomous take-off in certain conditions, scenarios and environments, for example where there are relatively poor lighting levels (for example indoors), where temperature differentiation is used, where objects and surfaces to be avoided are at a relatively small distance from the UAV and/or where relatively narrow fields of vision are used.

The take-off may be a vertical take-off. It is particularly effective for the UAV to be aware of the airspace above it during a vertical take-off as there is a relatively large change of the UAV colliding with overhead objects, compared for example to non-vertical take-offs.

The UAV may be a rotorcraft. Rotorcrafts may take off vertically, and so the application of the techniques and features described herein to rotorcraft is particularly effective in making autonomous rotorcraft take-off more effective, more efficient and safer.

The camera may have a fixed orientation with respect to a body of the UAV. This provides a relatively straightforward mechanism, which may result in relatively lightweight, low cost, easy-to-manufacture and easy-to-maintain UAV. However, use of a fixed-orientation camera during autonomous take-off, especially vertical autonomous take off, may be more difficult where the UAV tilts or shakes, which may occur often during take-off.

Alternatively, the camera may have an adjustable orientation with respect to a body of the UAV. While this may result in a more complicated mechanism than a fixed-orientation camera, the orientation of the camera may be maintained with regard to a reference object which may facilitate post-processing of captured image data.

The UAV may comprise an image stabiliser and the image data captured by the camera may be subject to image stabilisation. Image stabilisation may enhance autonomous take-off by providing a more consistent view of the airspace above the UAV.

The image data captured by the camera may comprise still image data. Such data may be more efficient to process than video data and may use less storage space in the UAV. Additionally or alternatively, the image data captured by the camera may comprise video data. Video data may use more storage space than still image data and may be more complicated to process, but allows the UAV to react to changes in the environment around the UAV during the autonomous take-off.

The controller may be operable to identify an attribute associated with an object within the field of view of the camera and to control the actuator based on the identified attribute. The UAV may therefore better react to a nearby object which may influence how the autonomous take-off is conducted.

The attribute may comprise a size of the object, an absolute location of the object, a relative location of the object, an object type of the object, a speed of travel of the object, a direction of travel of the object, a risk of collision of the UAV with the object, a distance of the object from the UAV and/or a unique identifier associated with the object. The UAV can thereby make more informed decisions during autonomous take-off based on more specific knowledge of the object.

The actuator may comprise a speed controller and the speed controller may be configured to control the speed controller so as to avoid physical interaction between the UAV and the object. As such, the UAV may be provided with autonomous object-avoidance functionality. This, in turn, can result in more effective, more efficient and safer autonomous take-off.

The actuator may be an alert controller and the alert controller may be configured to control the alert controller to cause an alert to be generated to alert the object to the presence of the UAV. As such, the object can be warned of the presence of the UAV. The object may, for example, move out of the way of the UAV (for example where the object is a bird and the bird can hear the alert). The UAV may be able to continue its planned course if the object no longer obscures the path of the UAV.

The UAV may comprise a further camera having a further field of view. As such, the UAV may be able to have a greater view of its surrounding environment to use during autonomous take-off. The further camera may also provide camera redundancy and fall-back, increasing robustness of the UAV.

The further camera may be configured in an upwards-facing configuration during the autonomous take-off procedure such that the further field of view of the further camera includes at least some of the airspace directly above the UAV. The further camera may facilitate identification of the presence or absence of an object in the airspace, for example where the other camera is damaged or dirty.

The camera and the further camera may be operable as a stereo camera pair. The UAV may therefore build a 3D or volumetric impression of its surrounding environment which may further enhance autonomous take-off by allowing the UAV to better determine a potential risk of collision with its surroundings based on 3D profile knowledge. The further camera may be configurable such that the further field of view of the further camera does not include the airspace directly above the UAV during the autonomous take-off procedure. The further camera in such cases may allow the UAV to obtain information relating to a different airspace around the UAV. For example, the further camera may be forward-facing and/or downward-facing.

The further camera may not be configurable such that the further field of view of the further camera includes the airspace directly above the UAV during the autonomous take-off procedure. Such a camera may be used for operations other than autonomous take-off.

The UAV may have a rotor and the field of view of the camera may not include any part of any rotor of the UAV. Post-processing of the image data captured by the camera may be facilitated in such cases since the image data does not include any part of any rotors, which may otherwise adversely affect control of the UAV during autonomous take-off. For example, the UAV may otherwise mistake the part of the rotor as a nearby object in relation to which a collision should be avoided. This may cause the UAV to go off-course and/or abandon autonomous take-off unnecessarily.

The UAV may have a rotor and the field of view of the camera may include at least part of the rotor. Such a UAV may be more compact and/or may have a relatively greater field of view than a UAV in which the field of view does not include any part of any rotor of the UAV.

In such cases, the UAV may be configured to post-process the image data captured by the camera to disregard the at least part of the rotor in the controlling of the actuator. As such, the UAV can take into account the presence of the rotor in the captured image data such that the UAV is aware that collision of the UAV with rotor is not possible. The UAV may disregard the at least part of the rotor by discarding it from the captured image data, by labelling any part(s) of the image data that include part of a rotor accordingly, by ignoring predetermined regions of the captured image data which are known to contain a rotor, or in another manner.

Various measures (for example methods) are provided to configure a UAV. The UAV is provided with a camera. The UAV is operable in an autonomous mode in which a controller of the UAV is arranged to receive data based on image data captured by the camera and to control, based on the received data, an actuator of the UAV during a take-off procedure. The camera is configured to be in an upwards-facing configuration during the take-off procedure such that a field of view of the camera includes airspace directly above the UAV during the take-off procedure. As such, the UAV can be configured to provide more efficient, more effective and safer operations during autonomous take-off. An existing UAV may be configured in this manner, for example by way of upgrade, retrofit or like.

Various measures (for example UAVs, controllers, methods, computer programs and computer-readable media) are provided in which a UAV has an upward-facing camera arranged to capture visible light from above the UAV. The UAV is arranged to use the captured visible light to control operation of the UAV while the UAV operates in an autonomous mode. As such, the UAV may take into account an object directly above the UAV when operating autonomously based on a property of the object that would also be visible to a human operator. Capturing visible light may assist in distinguishing and/or disambiguating between objects based on their colour and may be effective in some environments such as well-lit and/or outdoors environments.

Various measures (for example UAVs, controllers, methods, computer programs and computer-readable media) are provided in which a UAV has an upward-facing camera arranged to capture infrared radiation from above the UAV. The UAV is arranged to use the captured infrared to control operation of the UAV while the UAV performs take-off autonomously. As such, the UAV may take into account an object directly above the UAV when operating autonomously based on a property of the object that would not be visible to a human operator. Capturing infrared radiation may assist in distinguishing and/or disambiguating between objects based on their temperatures and may be effective in some environments such as poorly-lit and/or indoors environments.

Various measures (for example UAVs, controllers, methods, computer programs and computer-readable media) are provided in which a UAV has a skyward-facing camera. The UAV is arranged to use image data captured by the camera during autonomous vertical take-off. As such, the UAV can take into account the presence or absence of an object directly above the UAV when autonomously taking off vertically, where there is a large likelihood of collision with such an object.

Various measures (for example UAVs, controllers, methods, computer programs and computer-readable media) are provided in which a UAV comprises a camera, a controller, and an actuator. The UAV is operable in an autonomous mode in which the controller is arranged to receive data based on image data captured by the camera and to control the actuator during an autonomous procedure to cause physical interaction between the UAV and an object in a field of view of the camera based on the received data. The camera is configurable in an upwards-facing configuration during the autonomous procedure such that the field of view of the camera includes airspace directly above the UAV during the autonomous procedure. As such, and as a result of the physical interaction, the UAV may perform one or more predetermined tasks in relation to the object. Examples of such tasks include, but are not limited to, inspecting and repairing the object.

Various measures (for example UAVs, controllers, methods, computer programs and computer-readable media) are provided in which a UAV comprises a camera, a controller, and an actuator. The UAV is operable in an autonomous mode in which the controller is arranged to receive data based on image data captured by the camera, to receive data from an object within the field of view of the camera via a communication channel between the UAV and the object, and to control the actuator during an autonomous procedure based on the received data based on image data captured by the camera and the data received from the object. The camera is configurable in an upwards-facing configuration during the autonomous procedure such that a field of view of the camera includes airspace directly above the UAV during the autonomous procedure. As such, and as a result of controlling the actuator based on the data received from the object, the UAV may operate more effectively in relation to the object. The data received from the object may, for example, indicate how the object would like the UAV to operate, provides the UAV with information to enable the UAV to determine a preferred manner of operation etc.

Various measures (for example UAVs, controllers, methods, computer programs and computer-readable media) are provided in which a UAV is operable in an autonomous mode. The UAV comprises a sensor configurable in an upwards-facing configuration during an autonomous procedure such that a field of view of the sensor includes airspace directly above the UAV during the autonomous procedure. The UAV comprises an actuator. The UAV comprises a controller operable to receive, when the UAV operates in the autonomous mode, data based on data captured by the sensor, and to control the actuator during the autonomous procedure based on the received data and dependent on an object in the field of view of the sensor. As such, the object may be taken into account in controlling the UAV.

The UAV may comprise an image stabiliser and the image data captured by the camera may be subject to image stabilisation. Image stabilisation may enhance performance of an autonomous procedure by providing a more consistent view of the airspace above the UAV.

The controller may be operable to identify an object type of the object and to control the actuator to cause the UAV to avoid collision with a first predetermined type of object and cause the UAV to approach and/or make physical contact with a second predetermined type of object. As such, the UAV may operate more effectively autonomously by using an identified attribute of the object to determine how to operate in relation to the object. In particular, the UAV may determine how to operate in relation to the object based on the type of the object.

The controller may be operable to identify a risk of collision of the UAV with the object and to control the actuator to adapt a planned course for the autonomous procedure to cause the UAV to avoid collision with the object in response to the risk of collision with the object exceeding a threshold level. As such, integrity of the UAV and/or object may be preserved by adapting a planned course to avoid collision with the object.

The UAV may be configured to notify an entity other than the UAV of a change to the planned course for the autonomous procedure. Tracking of the UAV by the other entity is thereby facilitated.

The controller may be operable to identify a unique identifier of the object and to control the actuator based on the unique identifier. Operation of the UAV may be performed on a per-object basis. This may enable particularly effective operation across a range of objects.

The UAV may be configured to receive the unique identifier from the object. Association of the unique identifier with the object may be facilitated since the unique identifier is received from the object with which it is associated.

The UAV may be configured to perform a look-up using the unique identifier to determine an attribute of the object. As such, more attributes can be taken into account to determine how to operate most effectively in relation to the object.

The controller may be operable to control the actuator to cause physical interaction between the UAV and the object. This may enable one or more predetermined tasks to be performed in relation to the object. Examples of such tasks include, but are not limited to, inspecting and repairing the object.

The actuator may be an alert controller and the alert controller may be configured to control the alert controller to cause an alert to be generated to alert the object to the presence of the UAV. The object may be able to take an appropriate course of action in view of the alert. For example, the object may be able to move with a view to avoiding collision with the UAV, the object may be able to allow the UAV to physically interact with the object etc.

The UAV may have a rotor and the field of view of the camera may include at least part of the rotor. This may enable the UAV to be relatively compact.

The UAV may be configured to post-process the image data captured by the camera to disregard the at least part of the rotor in the controlling of the actuator. This may enable the UAV to be relatively compact and provide enhanced image-processing capabilities. For example, the at least part of the rotor may, in effect, be ignored and not treated, for example, as an object with which the UAV could potentially collide.

The UAV may be configured to store at least some of the captured data in memory of the UAV and to discard the at least some of the captured image data in response to successful completion of the autonomous procedure. This may provide an effective trade-off between efficient on-board memory usage and storing data that may be useful for auditing and/or evaluation purposes.

The UAV may comprise a light and the light may be configurable in an upwards-facing configuration during the autonomous procedure such that the light is operable to illuminate the object during the autonomous procedure. This may facilitate operation of the UAV, particularly in low-light conditions.

The autonomous procedure may comprise an autonomous take-off procedure, an autonomous in-flight procedure, an autonomous landing procedure, and/or an autonomous docking procedure. A relatively versatile UAV may thereby be provided.

Although examples have been described above which relate to UAVs that do not have a human pilot aboard, the techniques described herein may be applied to aircraft that have a human pilot aboard but which still provide a degree of autonomous control of at least some operations of the aircraft during an autonomous mode in which autonomous take-off is performed. For example, the techniques described herein may be applied to an aircraft that has a human pilot aboard, but which performs take-off at least partly autonomously.

Although examples have been described above in which the UAV 100 does not have an occupant (or 'passenger'), examples are envisaged in which the UAV 100 carries one or more occupants.

Although examples have been described above in which the camera(s) 105, 170 is/are arranged to capture visible light and/or infrared, examples are envisaged in which the camera(s) 105, 170 is/are arranged to capture electromagnetic radiation in one or more other portions of the spectrum, in addition to or as an alternative to visible light and/or infrared.

Although examples have been described above in which the UAV 100 comprises a camera 105, 170 that captures electromagnetic radiation, examples are envisaged in which the UAV 100 comprises another type of sensor. For example, a UAV 100 may comprise one or more ultrasonic sensors. The one or more ultrasonic sensors may be configurable in the upwards-facing configuration as described above. Data captured by the ultrasonic sensor(s) and/or data derived from such captured data may be used to control autonomous operation of the UAV 100.

Although examples have been described above in which the UAV 100 has one or more upward-facing cameras 105, 170, examples are envisaged in which the UAV 100 has one or more forward-facing, one or more sideways-facing, one or more rearward-facing, and/or one or more downward-facing cameras in addition to or as an alternative to the one or more upward-facing cameras 105, 170. The one or more forward-facing, one or more sideways-facing, one or more rearward-facing, and/or one or more downward-facing cameras may be used in conjunction with or as an alternative to the upwards-facing camera 105, 170, for example during autonomous take-off and/or other predetermined autonomous procedures.

Although examples have been described above in which the UAV 100 is operable in multiple different autonomous modes, examples are envisaged in which the UAV 100 is operable in only one autonomous mode.

Although examples have been described above in which the UAV 100 always performs take-off autonomously, examples are envisaged in which the UAV 100 can perform take-off non-autonomously. For example, a remote human operator may wish to perform a given take-off manually. In such cases, the UAV 100 may transmit the image data captured by the camera 105, 170 and/or data derived therefrom, for example to a remote-control device of the remote human operator.

Although examples have been described above which relate to a UAV, the techniques described herein may be performed by another type of device. For example, the techniques described herein may be performed by another type of vehicle that can operate in an autonomous mode. Examples of other types of vehicle include, but are not limited to, cars, vans and lorries.

The following numbered clauses on pages 35 to 43 of the present description correspond to the claims of UK patent application nos. GB1703174.1 and GB1801936.4, from which the present application claims priority, as filed. The claims of the present application as filed can be found on the subsequent pages 44 to 46 of the specification which begin with the heading "CLAIMS".

1. An unmanned aerial vehicle, UAV, comprising:
   a camera;
   a controller; and
   an actuator,
   wherein the UAV is operable in an autonomous mode in which the controller is arranged to receive data based on image data captured by the camera and to control the actuator during an autonomous take-off procedure based on the received data, and
   wherein the camera is configured in an upwards-facing configuration during the autonomous take-off procedure such that a field of view of the camera includes airspace directly above the UAV during the autonomous take-off procedure.
2. A UAV according to clause 1, wherein the camera is arranged to capture light in the visible spectrum.
3. A UAV according to clause 1 or 2, wherein the camera is arranged to capture infrared.
4. A UAV according to any of clauses 1 to 3, wherein the take-off is a vertical take-off.
5. A UAV according to any of clauses 1 to 4, wherein the UAV is a rotorcraft.
6. A UAV according to any of clauses 1 to 5, wherein the camera has a fixed orientation with respect to a body of the UAV.
7. A UAV according to any of clauses 1 to 5, wherein the camera has an adjustable orientation with respect to a body of the UAV.
8. A UAV according to any of clauses 1 to 7, wherein the UAV comprises an image stabiliser and wherein the image data captured by the camera is subject to image stabilisation.
9. A UAV according to any of clauses 1 to 8, wherein the image data captured by the camera comprises still image data.
10. A UAV according to any of clauses 1 to 9, wherein the image data captured by the camera comprises video data.
11. A UAV according to any of clauses 1 to 10, wherein the controller is operable to identify an attribute associated with an object within the field of view of the camera and to control the actuator based on the identified attribute.
12. A UAV according to clause 11, wherein the attribute comprises:
   a size of the object;
   an absolute location of the object;
   a relative location of the object;
   an object type of the object;
   a speed of travel of the object;
   a direction of travel of the object;

a risk of collision of the UAV with the object;
a distance of the object from the UAV; and/or
a unique identifier associated with the object.

13. A UAV according to clauses 11 or 12, wherein the actuator comprises a speed controller and wherein the speed controller is configured to control the speed controller so as to avoid physical interaction between the UAV and the object.

14. A UAV according to clauses 11 or 12, wherein the actuator is an alert controller and wherein the alert controller is configured to control the alert controller to cause an alert to be generated to alert the object to the presence of the UAV.

15. A UAV according to any of clauses 1 to 14, wherein the UAV comprises a further camera having a further field of view.

16. A UAV according to clause 15, wherein the further camera is configured in an upwards-facing configuration during the autonomous take-off procedure such that the further field of view of the further camera includes at least some of the airspace directly above the UAV.

17. A UAV according to clause 15 or 16, wherein the camera and the further camera are operable as a stereo camera pair.

18. A UAV according to clause 15, wherein the further camera is configurable such that the further field of view of the further camera does not include the airspace directly above the UAV during the autonomous take-off procedure.

19. A UAV according to clause 15 or 18, wherein the further camera is not configurable such that the further field of view of the further camera includes the airspace directly above the UAV during the autonomous take-off procedure.

20. A UAV according to any of clauses 1 to 19, wherein the UAV has a rotor and wherein the field of view of the camera does not include any part of any rotor of the UAV.

21. A UAV according to any of clauses 1 to 19, wherein the UAV has a rotor and wherein the field of view of the camera includes at least part of the rotor.

22. A UAV according to clause 21, wherein the UAV is configured to post-process the image data captured by the camera to disregard the at least part of the rotor in the controlling of the actuator.

23. A controller configured to be used to control an unmanned aerial vehicle, UAV, the UAV being operable in an autonomous mode, the controller being configured to, during an autonomous take-off procedure performed by the UAV:
receive data based on image data captured by a camera of the UAV, the camera being in an upwards-facing configuration during the autonomous take-off procedure such that a field of view of the camera includes airspace directly above the UAV during the autonomous take-off procedure; and
control, during the autonomous take-off procedure, an actuator of the UAV based on the received data.

24. A method of controlling an unmanned aerial vehicle, UAV, the UAV being operable in an autonomous mode, the method comprising, during an autonomous take-off procedure performed by the UAV:
receiving, by the controller, data based on image data captured by a camera of the UAV, the camera being in an upwards-facing configuration during the autonomous take-off procedure such that a field of view of the camera includes airspace directly above the UAV during the autonomous take-off procedure; and
controlling, by the controller, during the autonomous take-off procedure, an actuator of the UAV based on the received data.

25. A computer program arranged, when executed, to perform a method of method of controlling an unmanned aerial vehicle, UAV, the UAV being operable in an autonomous mode, the method comprising, during an autonomous take-off procedure performed by the UAV:
receiving, by the controller, data based on image data captured by a camera of the UAV, the camera being in an upwards-facing configuration during the autonomous take-off procedure such that a field of view of the camera includes airspace directly above the UAV during the autonomous take-off procedure; and
controlling, by the controller, during the autonomous take-off procedure, an actuator of the UAV based on the received data.

26. A computer-readable medium comprising a computer program according to clauses 25.

27. A method of configuring an unmanned aerial vehicle, UAV, the method comprising:
providing the UAV with a camera, the UAV being operable in an autonomous mode in which a controller of the UAV is arranged to receive data based on image data captured by the camera and to control, based on the received data, an actuator of the UAV during a take-off procedure; and
configuring the camera to be in an upwards-facing configuration during the take-off procedure such that a field of view of the camera includes airspace directly above the UAV during the take-off procedure.

28. An unmanned aerial vehicle, UAV, having an upward-facing camera arranged to capture visible light from above the UAV, the UAV being arranged to use the captured visible light to control operation of the UAV while the UAV operates in an autonomous mode.

29. An unmanned aerial vehicle, UAV, having an upward-facing camera arranged to capture infrared radiation from above the UAV, the UAV being arranged to use the captured infrared to control operation of the UAV while the UAV operates in an autonomous mode.

30. An unmanned aerial vehicle, UAV, having a skyward-facing camera, the UAV being arranged to use image data captured by the camera during autonomous vertical take-off.

31. An unmanned aerial vehicle, UAV, the UAV being operable in an autonomous mode, the UAV comprising:
a sensor configurable in an upwards-facing configuration during an autonomous procedure such that a field of view of the sensor includes airspace directly above the UAV during the autonomous procedure;
an actuator; and
a controller operable to:
receive, when the UAV operates in the autonomous mode, data based on data captured by the sensor; and
control the actuator during the autonomous procedure based on the received data and dependent on an object in the field of view of the sensor.

32. A UAV according to clause 31, wherein the controller is operable to:
identify an object type of the object; and
control the actuator to:
cause the UAV to avoid collision with a first predetermined type of object; and
cause the UAV to approach and/or make physical contact with a second predetermined type of object.

33. A UAV according to clause 31 or 32, wherein the controller is operable to:
identify a risk of collision of the UAV with the object; and
control the actuator to adapt a planned course for the autonomous procedure to cause the UAV to avoid collision with the object in response to the risk of collision with the object exceeding a threshold level.

34. A UAV according to clause 33, wherein the UAV is configured to notify an entity other than the UAV of a change to the planned course for the autonomous procedure.
35. A UAV according to any of clauses 31 to 34, wherein the controller is operable to control the actuator to cause physical interaction between the UAV and the object.
36. A UAV according to any of clauses 31 to 35, wherein the controller is arranged to receive data from the object and to control the actuator during the autonomous procedure based on the data received from the object.
37. A UAV according to any of clauses 31 to 36, wherein the controller is operable to identify an attribute associated with the object and to control the actuator based on the identified attribute.
38. A UAV according to clause 37, wherein the attribute comprises:
   a size of the object;
   an absolute location of the object;
   a relative location of the object;
   a speed of travel of the object;
   a direction of travel of the object;
   a distance of the object from the UAV; and/or
   a unique identifier associated with the object.
39. A UAV according to clause 38 when dependent on clause 36, wherein the data received from the object comprises the unique identifier associated with the object.
40. A UAV according to clause 38 or 39, wherein the UAV is configured to perform a look-up using the unique identifier to determine an attribute of the object other than the unique identifier associated with the object.
41. A UAV according to any of clauses 31 to 40, wherein the sensor comprises a camera and wherein the data captured by the sensor comprises image data.
42. A UAV according to clause 41, wherein the UAV comprises an image stabiliser and wherein the image data captured by the camera is subject to image stabilisation.
43. A UAV according to clause 41 or 42, wherein the UAV has a rotor and wherein the field of view of the camera includes at least part of the rotor.
44. A UAV according to clause 43, wherein the UAV is configured to post-process the image data captured by the camera to disregard the at least part of the rotor in the controlling of the actuator.
45. A UAV according to any of clauses 41 to 44, wherein the UAV comprises a further camera having a further field of view.
46. A UAV according to clause 45, wherein the further camera is configurable in an upwards-facing configuration during the autonomous procedure such that the further field of view of the further camera includes at least some of the airspace directly above the UAV.
47. A UAV according to clause 45 or 46, wherein the camera and the further camera are operable as a stereo camera pair.
48. A UAV according to any of clauses 31 to 47, wherein the UAV is configured to store at least some of the captured data in memory of the UAV and to discard the at least some of the captured data in response to successful completion of the autonomous procedure.
49. A UAV according to any of clauses 31 to 48, wherein the UAV comprises a light and wherein the light is configurable in an upwards-facing configuration during the autonomous procedure such that the light is operable to illuminate the object during the autonomous procedure.
50. A UAV according to any of clauses 31 to 49, wherein the autonomous procedure comprises:
   an autonomous take-off procedure;
   an autonomous in-flight procedure;
   an autonomous landing procedure; and/or
   an autonomous docking procedure.
51. A UAV according to clause 50, wherein the autonomous take-off procedure comprises an autonomous vertical take-off procedure.
52. A controller configured to be used to control an unmanned aerial vehicle, UAV, the UAV being operable in an autonomous mode, the UAV comprising a sensor and an actuator, the sensor being configurable in an upwards-facing configuration during an autonomous procedure such that a field of view of the sensor includes airspace directly above the UAV during the autonomous procedure, wherein the controller is operable to receive, when the UAV operates in the autonomous mode, data based on data captured by the sensor and wherein the is operable to control the actuator during the autonomous procedure based on the received data and dependent on an object in the field of view of the sensor.
53. A method of controlling an unmanned aerial vehicle, UAV, the UAV being operable in an autonomous mode, the UAV comprising a sensor, an actuator and a controller, the method comprising:
   receiving, when the UAV operates in the autonomous mode, data based on data captured by the sensor; and
   controlling the actuator during an autonomous procedure based on the received data and dependent on an object in a field of view of the sensor,
   wherein the sensor is configurable in an upwards-facing configuration during the autonomous procedure such that the field of view of the sensor includes airspace directly above the UAV during the autonomous procedure.
54. A computer program arranged, when executed, to perform a method according to clause 53.
55. A computer-readable medium comprising a computer program according to clause 54.

The invention claimed is:
1. An unmanned aerial vehicle, hereinafter referred to as a UAV, the UAV being operable in an autonomous mode, the UAV comprising:
   one or more sensors, the one or more sensors comprising an upwards-configurable sensor, the upwards-configurable sensor being configurable in an upwards-facing configuration during an autonomous procedure such that a field of view of the upwards-configurable sensor includes airspace directly above the UAV during the autonomous procedure;
   an actuator; and
   a controller operable to control the actuator during the autonomous procedure based on data captured by the one or more sensors,
   wherein the UAV is configured to repair an object, using a component obtained by the UAV based on defect data type, during the autonomous procedure based on identifying data received by the UAV from a remote human controller of the UAV, wherein the identifying data is arranged to identify the object, and wherein the identifying data comprises visual representation data and/or location data.
2. The UAV of claim 1, wherein the controller is operable to receive data from the object and to control the actuator during the autonomous procedure based on the data received from the object.
3. The UAV of claim 1, wherein the UAV is configured to make physical contact with the object during the autonomous procedure.
4. The UAV of claim 1, wherein the UAV comprises an upwards-configurable light, the upwards-configurable light being configurable in the upwards-facing configuration during the autonomous procedure.

5. The UAV of claim 1, wherein the controller is operable to identify a unique identifier of the object and to control the actuator based on the unique identifier.

6. The UAV of claim 5, wherein the controller is operable to receive the unique identifier from the object.

7. The UAV of claim 1, wherein the one or more sensors comprise a camera, wherein the camera is configured to capture image data, wherein the UAV comprises an image stabiliser, and wherein the image data captured by the camera is subject to image stabilisation by the image stabiliser.

8. The UAV of claim 1, wherein the object is a bridge.

9. The UAV of claim 1, wherein the object is a vehicle.

10. The UAV of claim 9, wherein the vehicle is a UAV.

11. The UAV of claim 1, wherein the UAV has a rotor and wherein the field of view of the upwards-configurable sensor includes at least part of the rotor.

12. The UAV of claim 11, wherein the UAV is configured to post-process the data captured by the upwards-configurable sensor to disregard the at least part of the rotor in the controlling of the actuator.

13. The UAV of claim 1, wherein the UAV comprises memory, wherein the UAV is configured to store at least some of the captured data in memory of the UAV, and wherein the UAV is configured to discard the at least some of the captured data in response to successful completion of the autonomous procedure.

14. The UAV of claim 1, wherein the controller is operable to identify an object type of the object and to control the actuator based on the object type of the object.

15. An unmanned aerial vehicle, hereinafter referred to as a UAV, the UAV being operable in an autonomous mode, the UAV comprising:

one or more sensors, the one or more sensors comprising an upwards-configurable sensor, the upwards-configurable sensor being configurable in an upwards-facing configuration during an autonomous procedure such that a field of view of the upwards-configurable sensor includes airspace directly above the UAV during the autonomous procedure;

an actuator; and a controller operable to control the actuator during the autonomous procedure based on data captured by the one or more sensors, wherein the UAV is configured to identify a defect with an object and to repair the defect using an obtained component, the obtained component having been obtained by the UAV based on defect type data, the defect type data being arranged to indicate a defect type of the defect.

16. An unmanned aerial vehicle, hereinafter referred to as a UAV, the UAV being operable in an autonomous mode, the UAV comprising:

one or more sensors, the one or more sensors comprising an upwards-configurable sensor, the upwards-configurable sensor being configurable in an upwards-facing configuration during an autonomous procedure such that a field of view of the upwards-configurable sensor includes airspace directly above the UAV during the autonomous procedure;

an actuator; and a controller operable to control the actuator during the autonomous procedure based on data captured by the one or more sensors, wherein the UAV has a rotor, wherein the field of view of the upwards-configurable sensor includes at least part of the rotor, and wherein the UAV is configured to post-process the data captured by the upwards-configurable sensor by filtering out the at least part of the rotor.

17. The UAV of claim 1, wherein the UAV is configured to:

provide power to the object;

receive power from the object; and/or inspect the object.

18. The UAV of claim 1, wherein the defect type data is arranged to indicate a defect type of one or more defects of the object.

* * * * *